United States Patent
Sexton

(10) Patent No.: US 11,468,006 B2
(45) Date of Patent: Oct. 11, 2022

(54) SYSTEMS AND METHODS TO FACILITATE PRIORITIZATION OF DOCUMENTS IN ELECTRONIC DISCOVERY

(71) Applicant: JND HOLDINGS LLC, Seattle, WA (US)

(72) Inventor: Benjamin David Sexton, Stillwater, MN (US)

(73) Assignee: JND HOLDINGS LLC, Seattle, WA (US)

(*) Notice: Subject to any disclaimer, the term of this patent is extended or adjusted under 35 U.S.C. 154(b) by 235 days.

(21) Appl. No.: 16/721,713

(22) Filed: Dec. 19, 2019

(65) Prior Publication Data
US 2020/0201816 A1    Jun. 25, 2020

Related U.S. Application Data

(60) Provisional application No. 62/782,704, filed on Dec. 20, 2018.

(51) Int. Cl.
| | |
|---|---|
| G06F 17/00 | (2019.01) |
| G06F 16/14 | (2019.01) |
| G06F 16/185 | (2019.01) |
| G06N 20/00 | (2019.01) |

(52) U.S. Cl.
CPC .......... *G06F 16/148* (2019.01); *G06F 16/185* (2019.01); *G06N 20/00* (2019.01)

(58) Field of Classification Search
CPC ...... G06F 16/148; G06F 16/185; G06F 16/93; G06F 16/11; G06N 20/00; G06Q 10/10; G06Q 50/18

See application file for complete search history.

(56) References Cited

U.S. PATENT DOCUMENTS

| | | | | |
|---|---|---|---|---|
| 8,849,775 B2* | 9/2014 | Smola | ................. | G06F 16/9574 707/694 |
| 9,529,908 B2* | 12/2016 | Risvik | ............... | G06F 16/24578 |
| 9,836,530 B2* | 12/2017 | Priel | ...................... | G10L 15/08 |
| 10,354,203 B1* | 7/2019 | Carr | ...................... | G06N 20/20 |

OTHER PUBLICATIONS

Torsten Grabs, Klemens Böhm, and Hans-Jörg Schek. PowerDB-IR: information retrieval on top of a database cluster. In Proceedings of the tenth international conference on Information and knowledge management (CIKM '01). Association for Computing Machinery, 411-418, October (Year: 2001).*

* cited by examiner

*Primary Examiner* — Greta L Robinson
(74) *Attorney, Agent, or Firm* — Davis Wright Tremaine LLP; George C. Rondeau, Jr.; Heather M. Colburn

(57) ABSTRACT

A method performed by at least one computing system and including performing a document identifying operation on a corpus of documents. The documents are associated one each with a plurality of numeric tier scores. The operation identifies results including one or more of the documents. The method includes calculating each tier score in a portion of the numeric tier scores and organizing the documents into tiers based at least in part on the numeric tier scores. The portion of the numeric tier scores is identified based on the results. The tiers are ranked from most to least relevant and include relevant and non-relevant portions. The method includes sending any of the tiers in the relevant portion one at a time to one or more reviewer computing devices in an order determined by the ranking. Any of the tiers in the non-relevant portion are not sent to reviewer computing device(s).

81 Claims, 14 Drawing Sheets

| TIER SCORE | DOC COUNT |
|---|---|
| | = ▼ FILTER |
| 17 | 1 |
| 16 | 1 |
| 15 | 2 |
| 14 | 6 |
| 13 | 13 |
| 12 | 16 |
| 11 | 39 |
| 10 | 57 |
| 9 | 107 |
| 8 | 122 |
| 7 | 468 |
| 6 | 2,066 |
| 5 | 2,397 |
| 4 | 4,386 |
| 3 | 6,003 |
| 2 | 11,112 |
| 1 | 15,089 |

FIG. 3

▽ CUSTODIANS PER TIER SCORE ⟶ ▽⊗ | 1 |—19/19| 25 ◇ | PER PAGE |◁◁◁▷▷| ⫶

| TIER SCORE | DASOVICH, JEFF | FARMER, JANICE | GERMANY, CHRIS | GUZMAN, AARON | KAMINSKI, VINCENT | LAY, KEN | NEMEC, GERALD | SCOTT, DANIEL |
|---|---|---|---|---|---|---|---|---|
| FILTER | ▽ FILTER | ▽ FILTER | ▽ FILTER | ▽ FILTER | ▽ FILTER | ▽ FILTER | ▽ FILTER | ▽ FILTER |
| 13 | 12 |  | 0 | 0 | 0 | 1 | 0 | 0 |
| 12 | 14 |  | 1 | 0 | 0 | 1 | 0 | 0 |
| 11 | 30 |  | 0 | 0 | 4 | 2 | 1 | 0 |
| 10 | 53 |  | 1 | 0 | 0 | 0 | 1 | 0 |
| 9 | 64 |  | 0 | 0 | 22 | 4 | 3 | 6 |
| 8 | 37 |  | 7 | 1 | 30 | 16 | 6 | 13 |
| 7 | 212 |  | 25 | 10 | 88 | 38 | 21 | 55 |
| 6 | 229 |  | 20 | 22 | 310 | 1,240 | 71 | 107 |
| 5 | 650 | 97 | 203 | 106 | 473 | 275 | 172 | 165 |
| 4 | 1,318 | 219 | 291 | 1,128 | 906 | 405 | 413 | 266 |
| 3 | 2,206 | 351 | 604 |  | 1,018 | 239 | 600 | 231 |
| 2 | 3,111 | 591 | 750 |  | 3,794 | 275 | 1,559 | 216 |
| 1 | 3,817 | 2,510 | 2,099 |  | 705 | 72 | 2,172 | 527 |
| 0 | 4,509 | 1,444 | 1,633 | 797 | 4,101 | 1,037 | 1,697 | 1,827 |
| | 810 | 812 | 813 | 814 | 815 | 816 | 817 | 818 |

SYSTEMS AND METHODS TO FACILITATE PRIORITIZATION OF DOCUMENTS IN ELECTRONIC DISCOVERY

CROSS REFERENCE TO RELATED APPLICATION(S)

This application claims the benefit of U.S. Provisional Application No. 62/782,704, filed on Dec. 20, 2018, which is incorporated herein by reference in its entirety.

BACKGROUND OF THE INVENTION

Field of the Invention

The present invention is directed generally to methods of identifying relevant documents within a document corpus.

Description of the Related Art

Electronic Discovery ("E-Discovery") is a field that addresses identification and production of electronic evidence (referred to as "documents") relevant to a digital investigation or litigation. The process of identifying documents relevant to a legal dispute typically involves three phases:

1. A document collection phase during which documents are harvested from information systems and indexed in a searchable database to establish a document corpus;
2. An Early Case Assessment ("ECA") phase during which queries and analytic operations are run against the document corpus to eliminate irrelevant documents and narrow the potentially relevant document universe prior to a human review phase; and
3. A human review phase during which attorneys make human determinations as to the relevance of each document in the document corpus.

Mounting document corpora have made human review increasingly time consuming and costly. Each relevance determination made by an attorney through human review costs approximately $1.25 based on industry averages. In a modern litigation, initial document corpora regularly exceed 10 million ("MM") potentially relevant documents, of which less than 1% are often deemed relevant. Because of the significant time and cost associated with human review, eliminating irrelevant documents from the document corpus prior to human review is a high priority. As a result, automated methods for reducing the document corpus prior to human review have become essential to the successful execution of an E-Discovery project.

Various document retrieval methods have been established for identifying a subset of documents that require human review, including conceptual analytics techniques (e.g., Latent Semantic Indexing), Boolean searching, and metadata-based analytics (e.g., communication analysis). Most document retrieval methods result in a binary classification (positive or negative) and, as a result, may be validated (or invalidated) through statistical sampling to estimate a recall rate and a precision value for the results.

A perfect E-Discovery document retrieval model would identify all relevant documents within the larger document corpus (or have a recall rate=1.0) and without generating any false positives (or have a precision value=1.0). In such a scenario, attorneys would not be required to review any irrelevant documents, resulting in maximum time and cost savings.

BRIEF DESCRIPTION OF THE SEVERAL VIEWS OF THE DRAWING(S)

FIG. 3 illustrates an example Tier Score results dashboard that includes a grid display 300 that breaks a document corpus down by Tier Score.

FIG. 8 illustrates a Tier Score per Custodian grid or chart.

Like reference numerals have been used in the figures to identify like components.

DETAILED DESCRIPTION OF THE INVENTION

Figure 1:
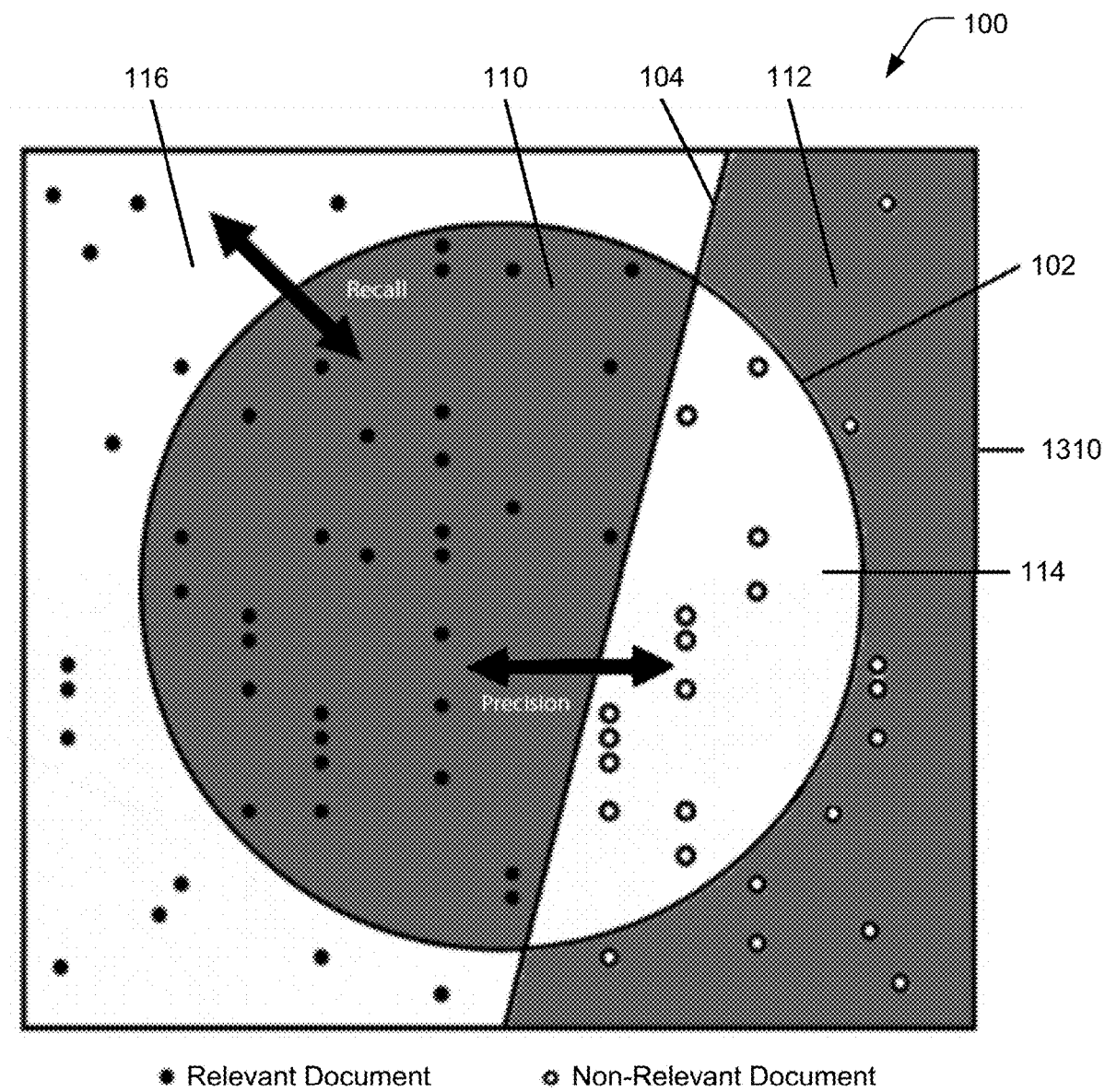
FIG. 1 is a diagram illustrating results obtained from a document identifying operation performed on a document corpus divided into true positive, true negative, false positive, and false negative values.

Electronic evidence is referred to herein as being one or more "documents." However, such electronic evidence need not be a conventional document and includes other types of evidence produced during discovery, such as electronic documents, electronic mail ("email"), text messages, electronic records, contracts, audio recordings, voice messages, video recordings, digital images, digital models, physical models, a structured data set, an unstructured data set, and the like. The disclosed embodiments provide a set of methods, systems, and data structures that rank documents based on their relevance to a legal matter. Document rank is calculated based on a composite of user-defined document identifying operations (e.g., document queries and analytic results) performed on the documents. When a document is identified by one or more document identifying operations, that document is a positive value or a "hit" with respect to the document identifying operation(s). Herein, the term "relevance" is used generally to define a positive set of documents, and may be used interchangeably with the term "responsiveness" or other terms defining a positive value.

As explained above, during the ECA phase, document identifying operations, such as document retrieval methods, queries, and other analytic operations, are run against a document corpus (collected during the document collection phase) to eliminate irrelevant documents and narrow a potentially relevant document universe prior to the human review phase. By way of non-limiting examples, these document identifying operations may include one or more of the following document identifying operations.

A Boolean Search, which is a keyword-based query run against an indexed database of text. For example, a Boolean search for "mediat*" will retrieve all documents containing the contiguous string "mediat" followed by any number of additional characters, including: mediate, mediation, and mediated.

A Concept Search in which a phrase or extended string of text is submitted as a query against a conceptual search index, usually generated through a form of Latent Semantic Indexing. Documents sharing similar conceptual content to the query are returned as search results. For example, a document containing the terms "software development agreement" may be a positive result for a concept search for "contract engagement design."

A Cluster Analysis, which is unassisted from human input, and involves a text analytics engine grouping the documents into clusters based on their conceptual similarity as determined by the text analytics engine. Potentially relevant clusters of documents are promoted for human review.

A Technology Assisted Review ("TAR"), in which a TAR engine is trained using a sampling of human review decisions and sample documents as a training set (e.g., 1,000 "seed" documents tagged as "relevant" or "not relevant"), and, after being trained, categorizes the unreviewed document in the document corpus as relevant or not relevant based on each document's conceptual similarity to one or more sample documents in the training set.

A Metadata Query in which metadata is searched. The metadata includes a number of attributes (e.g., more than 100) that are extracted from each electronic document during electronic file processing. Key metadata artifacts or attributes considered during an investigation usually include: Author, Company, Date Sent, Date Modified, File Type, Email Subject, To, From, CC and BCC. Metadata analysis can be used to identify documents that meet specific circumstantial criteria for potential relevance (e.g., all videos sent between two key individuals within a specified timeframe).

Alternatively or in addition, the document identifying operations may include content searching, analytics techniques (e.g., Latent Semantic Indexing), and/or metadata-based analytics (e.g., communication analysis).

The document corpus may be stored as a structured or unstructured data set. In such embodiments, the document identifying operations may be queries formulated from one or more attributes and/or criteria.

Most commercially available document retrieval technologies deliver results in a binary format, in that each document is either identified (e.g., positive) or not identified (e.g., negative) by a particular document identifying operation. In legal disputes, many factors influence whether a document is considered relevant, and relevance usually arises in varying degrees. Currently available technologies fail to effectively factor multiple document identifying operations, which may include different conceptual and objective document retrieval methodologies and/or be performed by multiple document retrieval systems, into an easily leveraged scoring system. In contrast, referring to FIG. 12, a method 1200 is configured to aggregate such results and to accelerate the process of identifying relevant documents.

Figure 2:
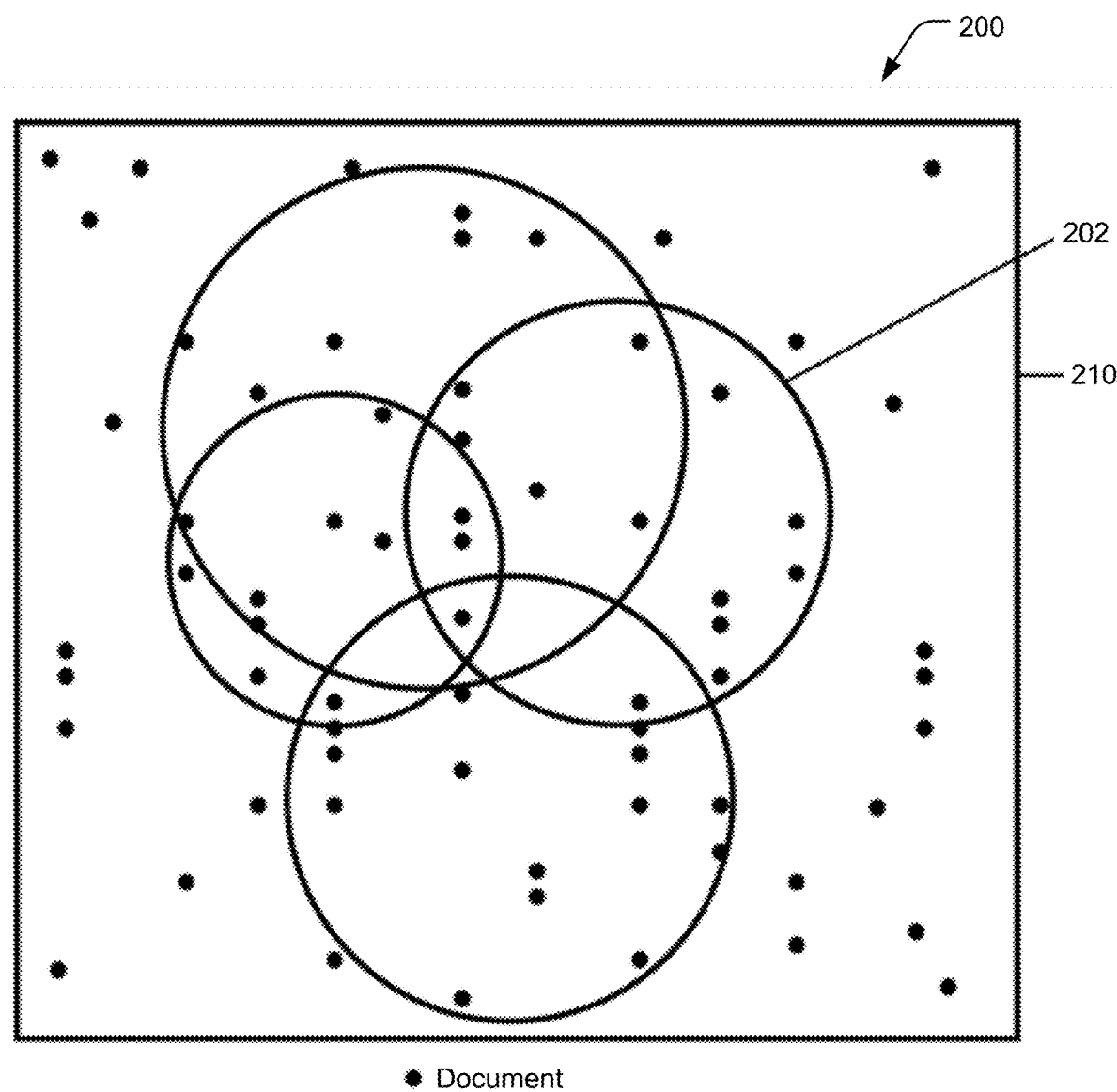
FIG. 2 illustrates a Venn diagram depicting results obtained from multiple document identifying operations performed on an example document corpus.

For example, FIG. 2 illustrates a Venn diagram 200 that includes circles or rings 202 that each represent results obtained from a different document identifying operation performed on an example document corpus 210. Thus, the Venn diagram 200 depicts results obtained from multiple document identifying operations (e.g., queries) performed on the document corpus 210, which was collected during the document collection phase.

During a traditional ECA project (e.g., performed during the ECA phase), attorneys develop a list of criteria that may indicate whether a particular document is relevant. For example, the list of criteria may include six keywords for one or more Boolean searches, criteria for two concept searches, selected clusters from four cluster analyses, criteria for one TAR project, four key email participants for one or more metadata queries, and one key timeframe for a metadata query. The criteria in this list locates the following numbers of documents:

Boolean search(es) for six keywords—50,000 documents;
Two concept searches—15,000 documents;
Four cluster analyses—45,000 documents;
One TAR project—100,000 documents;
Metadata query/queries for four key email participants—35,000 documents; and
Metadata query for key timeframe—300,000 documents.

Before the human review phase, an attorney selects a combination of the above document identifying operations to identify a set of 75,000 documents that will be promoted for human review. A precision value and a recall rate of the results are a function of the attorney's ability to forecast who sent the key documents, when they were sent, and the specific terminology used to discuss the relevant issues. The results are binary, in that documents that do not meet the conditions (or are not identified by the selected combination of the document identifying operations) are excluded from the human review and those that are positive hits (or are identified) are promoted for the human review. Thus, the challenge presented is prescribing a specific "stack" of multiple document identifying operations that will identify relevant documents with high recall rate and precision value. Unfortunately, this often amounts to a guessing game.

Figure 12:
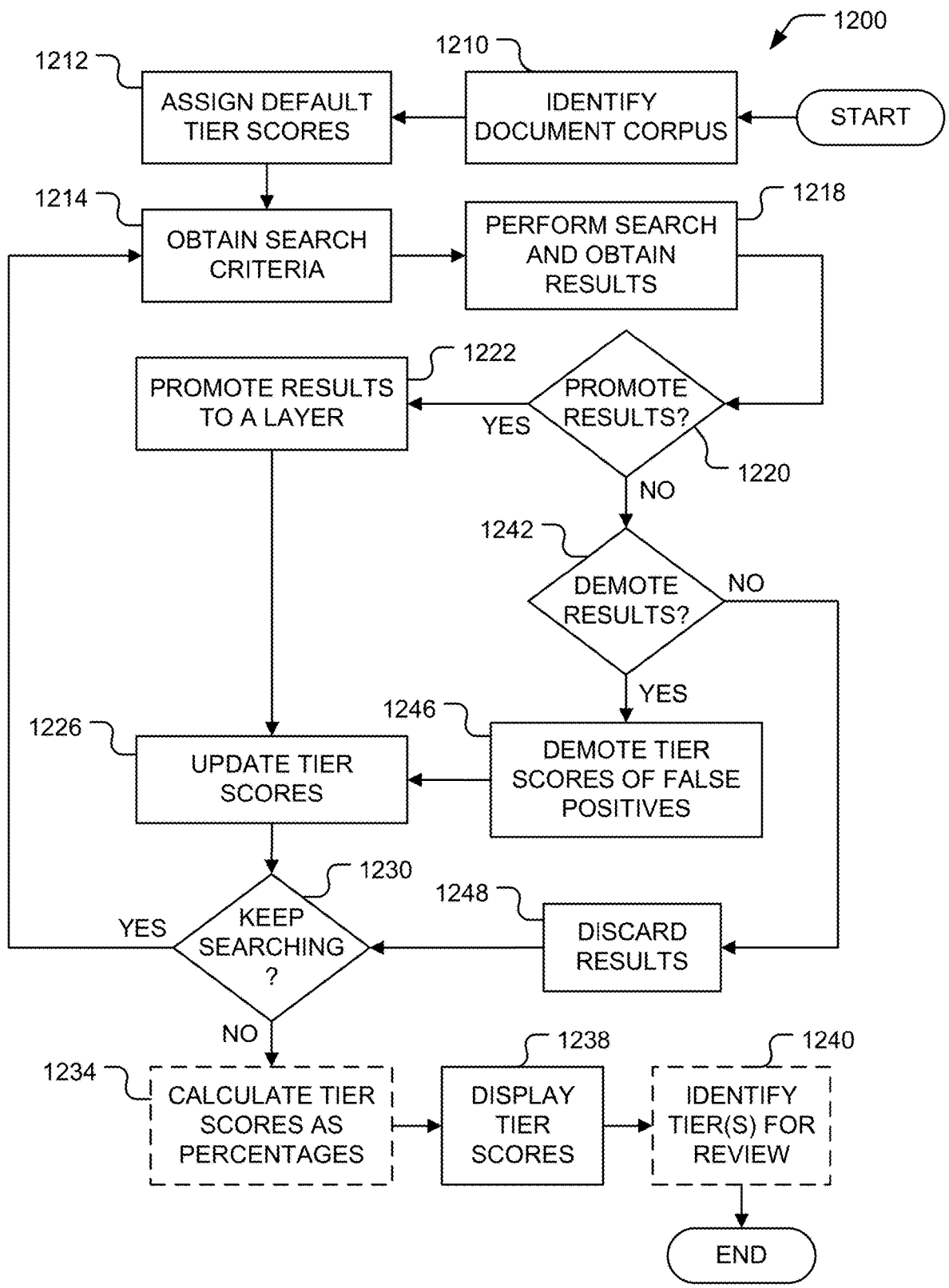
FIG. 12 is a flow diagram of the method.
Figure 13:
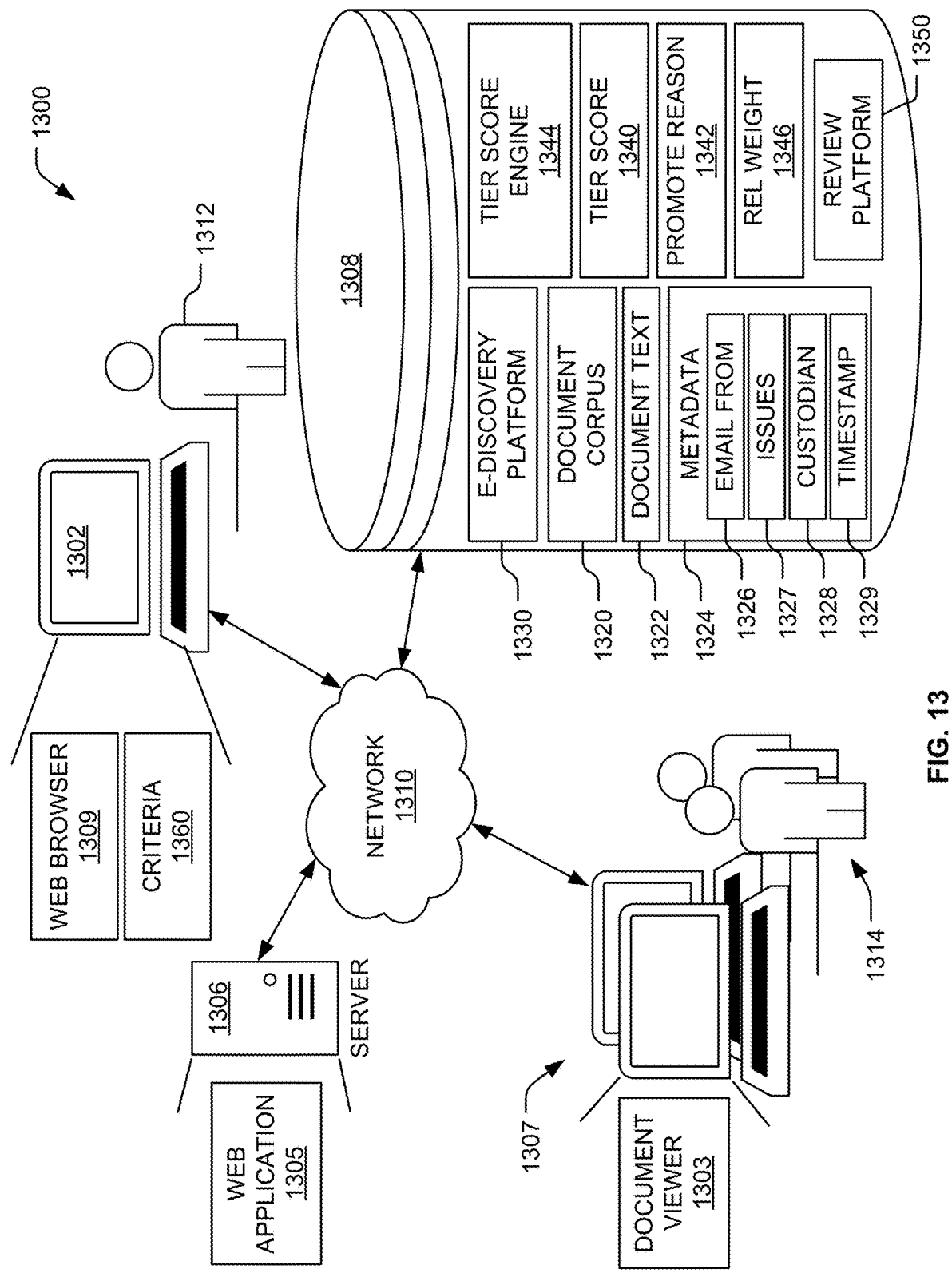
FIG. 13 is a block diagram of the system configured to perform the method of FIG. 12.

FIG. 12 is a flow diagram of the method 1200 that may be performed by a system 1300 (see FIG. 13). As opposed to delivering a binary result, the method 1200 calculates a composite score, referred to as a "Tier Score," for each document based on how many of the document identifying operations identified the document and, in some embodiments, on which of the document identifying operations identified the document. The method 1200 measures a degree of overlap between results obtained by the different document identifying operations and assigns each document a Tier Score based on a relevance weight (represented by a relevance weight variable "$\alpha$" below) and a number of document identifying operations that identified the document as being a "hit." The method 1200 may present the user with a table or grid display 300 (see FIG. 3) that breaks the document corpus down by Tier Score. FIG. 3 illustrates an example Tier Score results dashboard 310 that includes the grid display 300. The Tier Score can be characterized as being a measure of a degree of overlap between the rings 202 of the Venn diagram 200 illustrated in FIG. 2.

Referring to FIG. 13, the system 1300 includes a client computing device 1302, a server 1306, one or more reviewer computing devices 1307, and a searchable database 1308.

The client computing device 1302, the server 1306, the reviewer computing device(s) 1307, and the searchable database 1308 may be connected to one another by a network 1310. In the embodiment illustrated, the server 1306 is implemented as web server configured to execute a web application 1305. By way of a non-limiting example, web server may be implemented using Internet Information Services ("IIS") for Microsoft Windows® Server. In such embodiment, the web application 1305 may be hosted in IIS. The web application 1305 is configured to communicate with a web browser 1309 executing on the client computing device 1302 and a document viewer application 1303 executing on each of the reviewer computing device(s) 1307.

The client computing device 1302 is operated by an operator or user 1312 and the reviewer computing device(s) 1307 is/are operated by document review team 1314 (e.g., including one or more attorneys).

The searchable database 1308 executes on a computing device and may be implemented using Microsoft SQL server and/or a similar database program. The searchable database 1308 may execute on the server 1306 or another computing device connected to the server 1306 (e.g., by the network 1310).

The searchable database 1308 stores a corpus 1320 of electronic documents. For each document in the corpus 1320, the searchable database 1308 stores extracted document text 1322 and metadata 1324. For each document, the metadata 1324 stores parameters or field values extracted from or about the document. By way of non-limiting examples, the metadata 1324 may store an "Email From" metadata field 1326, an issues metadata field 1327, a custodian metadata field 1328, a timestamp metadata field 1329, an Author metadata field, a Company metadata field, a Date Sent metadata field, a Date Modified metadata field, a File Type metadata field, an "Email Subject" metadata field, an "Email To" metadata field, an "Email CC" metadata field, an "Email BCC" metadata field, and the like.

The searchable database 1308 is configured to facilitate document retrieval through standard analytical operations and querying methodologies performed against the document text 1322 and the metadata 1324. For example, the searchable database 1308 may implement an E-Discovery Platform 1330 configured to perform document identifying operations (e.g., document retrieval methods, analyses, and the like) on the document text 1322 and/or the metadata 1324. The E-Discovery Platform 1330 may leverage one or more known methods (e.g., document retrieval methods). The E-Discovery Platform 1330 has been described and illustrated as being implemented by the searchable database 1308. However, this is not a requirement. Alternatively, at least a portion of the E-Discovery Platform 1330 may be implemented by the client computing device 1302, the server 1306, and/or another computing device. At least a portion of the E-Discovery Platform 1330 may be implemented using one or more commercially available products.

The searchable database 1308 also stores two document-level database fields for each document: a Tier Score field 1340 and a Promotion Reason field 1342. By default, the Tier Score field 1340 may be set equal to zero and the Promotion Reason field 1342 may be empty for all of the documents in the corpus 1320. The searchable database 1308 implements a Tier Score engine 1344, which calculates the Tier Scores stored in the Tier Score field 1340 for the electronic documents of the corpus 1320. Optionally, the searchable database 1308 may stores a relevance weight field 1346 for each layer (described below).

The searchable database 1308 implements a Review Platform 1336 configured to communicate with the document viewer application 1303 executing on each of the reviewer computing device(s) 1307. During the human review phase, which of the review team 1314 uses the document viewer application 1303 to access the Review Platform 1336. The Review Platform 1336 is configured to retrieve and send one or more of the documents to each of the reviewer computing device(s) 1307. The document(s) is/are presented to the review team 1314 through the document viewer application 1303.

Figure 11:
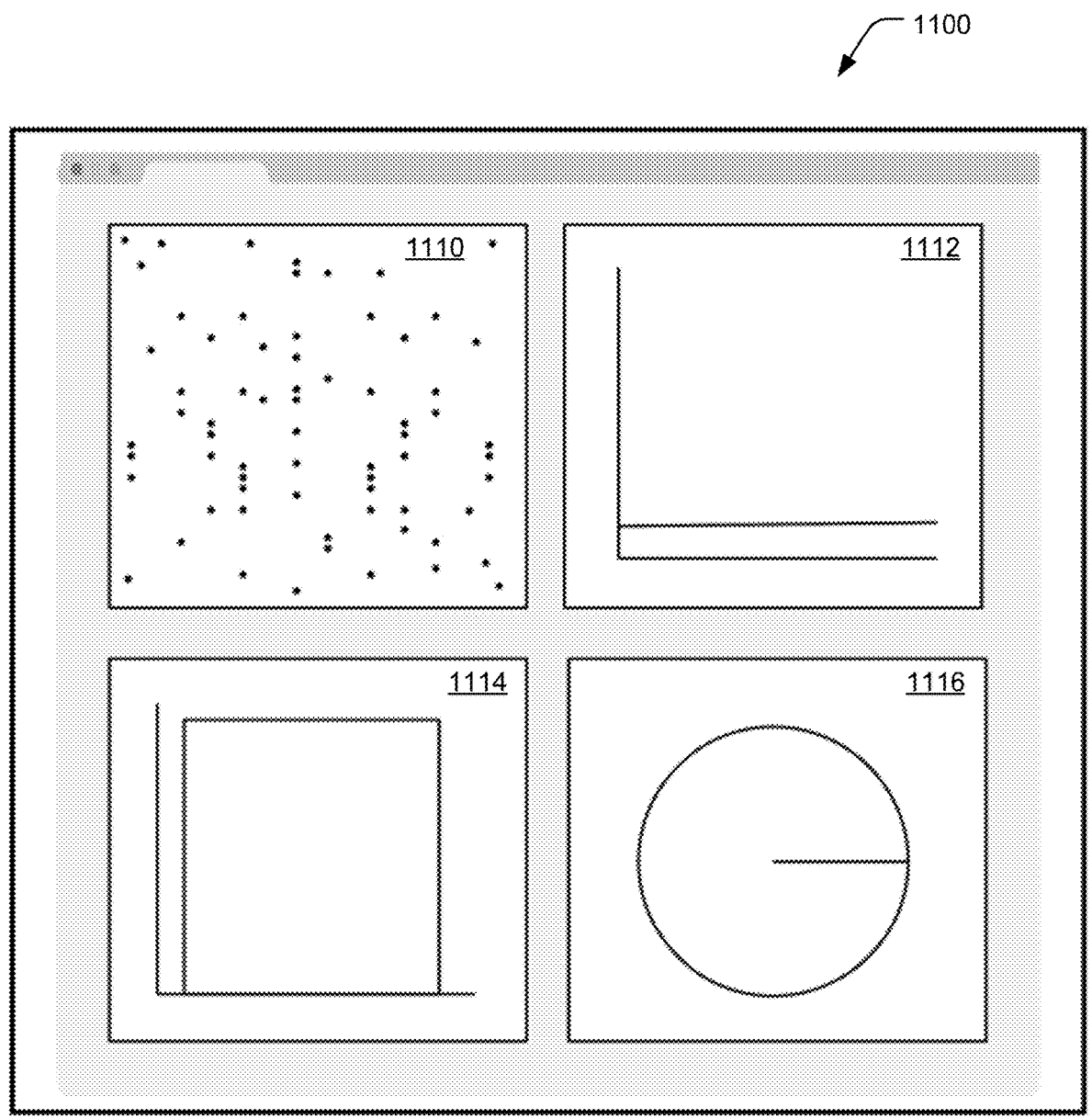
FIG. 11 illustrates a dashboard interface including graphics that represent various relationships between the Tier Score and other metadata and analytics-based characteristics.

Before the method 1200 (see FIG. 12) is performed, a dashboard interface 1100 (see FIG. 11) may be displayed to the user 1312. The web application 1305 may extract information from the searchable database 1308 and use this information to generate a web interface that the web application 1305 sends to the web browser 1390 for display thereby to the user 1312. Referring to FIG. 11, the dashboard interface 1100 may include several interactive HTML-based graphics 1110-1116 representing various relationships between the Tier Scores (stored in the Tier Score field 1340 illustrated in FIG. 13) and other metadata (stored in the metadata 1324 illustrated in FIG. 13) and between the Tier Scores and analytics-based characteristics. Prior to running any document identifying operations against the searchable database 1308 (see FIG. 13), the dashboard interface 1100 is unpopulated with results as illustrated in FIG. 11.

Referring to FIG. 12, the method 1200 is configured to be performed against the corpus 1320 (see FIG. 13). In first block 1210, the user 1312 (see FIG. 13) identifies the corpus 1320 (see FIG. 13) for which Tier Scores are desired and communicates this selection to the E-Discovery Platform 1330. For example, in block 1210, the user 1312 may identify a corpus that includes five documents, assigned Control Numbers 1-5, which are listed in the leftmost column of Table A below. To communicate with the E-Discovery Platform 1330, the user 1312 may log into the E-Discovery Platform 1330, if required.

TABLE A

| Control No. | Default Tier Score |
|---|---|
| 1 | 0 |
| 2 | 0 |
| 3 | 0 |
| 4 | 0 |
| 5 | 0 |

Then, in next block 1212, the Tier Score engine 1344 (see FIG. 13) assigns a default value (e.g., zero) to each of the documents in the corpus 1320 (see FIG. 13). As shown in the rightmost column of Table A above, the Tier Score engine 1344 may assign the default value of zero to each of the documents assigned the Control Numbers 1-5.

Then, in block 1214, the user 1312 identifies criteria 1360 (see FIG. 13) configured to select a set of documents from the corpus 1320 and communicates the criteria 1360 to the E-Discovery Platform 1330. The criteria 1360 identifies a document identifying operation (e.g., a document retrieval method) to be performed by the E-Discovery Platform 1330 along with values of any parameters required by the document identifying operation. As mentioned above, the document identifying operation may be a commercially available document retrieval technique (e.g., Boolean searching or conceptual analytics). The criteria 1360 may be relevance criteria configured to identify documents to be promoted to a layer or non-relevance criteria configured to identify documents to be demoted. Relevance criteria need not generate a high precision value and/or a high recall rate, but must, at a minimum, be able to identify groups of documents that are more likely to be relevant than a random sample from the corpus 1320. The user 1312 has an understanding of the legal matter and identifies the criteria 1360 that will identify potentially relevant documents. Thus, through promoting and demoting binary query results, the user 1312 is able to prioritize the document population by each document's likelihood to be relevant to the legal matter.

The method 1200 (see FIG. 12) does not impose any requirements on the document identifying operation to be performed by the E-Discovery Platform 1330, except that the document identifying operation must produce a binary (i.e., positive and negative) classification with respect to each of the documents.

Next, in block 1218 (see FIG. 12), the E-Discovery Platform 1330 applies the criteria 1360 and obtains results. Thus, at block 1218, the user 1312 performs the document identifying operation using the E-Discovery Platform 1330. By way of non-limiting examples, the document identifying operation may include one or more Boolean searches, one or more conceptual classifications, one or more metadata conditions (e.g. a relevant timeframe), one or more predictive analytics, and/or other document retrieval techniques.

Documents identified by the E-Discovery Platform 1330 as satisfying the criteria 1360 identified in block 1214 are described as being "hits." Regardless of which criteria (or combination of criteria) are deployed, the results include a set of positive "hits" that meet the conditions set forth by the user 1312, and a set of negative "non-hits" that do not meet the conditions set forth by the user 1312. One or more of the documents may be a positive result for multiple document identifying operations. In other words, the results of multiple document identifying operations often overlap. The results are usually presented to the user 1312 in the form of a list listing one or more of the documents of the corpus 1320.

Regardless of the document identifying operation used, the positive results or "hits" obtained by the document identifying operation may be promoted to a "layer," used to demote the documents identified by the result, or discarded. Thus, the server 1306 may send the results to the client computing device 1302 for review by the user 1312.

Referring to FIG. 12, in decision block 1220, the user 1312 (see FIG. 13) decides whether to promote the results of the document identifying operation performed in block 1218 to the Tier Score engine 1344 (see FIG. 13) for consideration as a "layer." When the user 1312 decides to promote the results, the decision in decision block 1220 is "YES." For example, if a search for the term "contraband" returns search hits that are potentially relevant to the legal matter, the user 1312 may promote these results to a layer. Referring to FIG. 2, each layer (or criteria for relevance) can be visualized as one of the rings 202 of the Venn diagram 200. On the other hand, referring to FIG. 12, the decision in decision block 1220 is "NO" when the user 1312 concludes the results of the document identifying operation performed in block 1218 do not indicate relevance.

Figure 4:
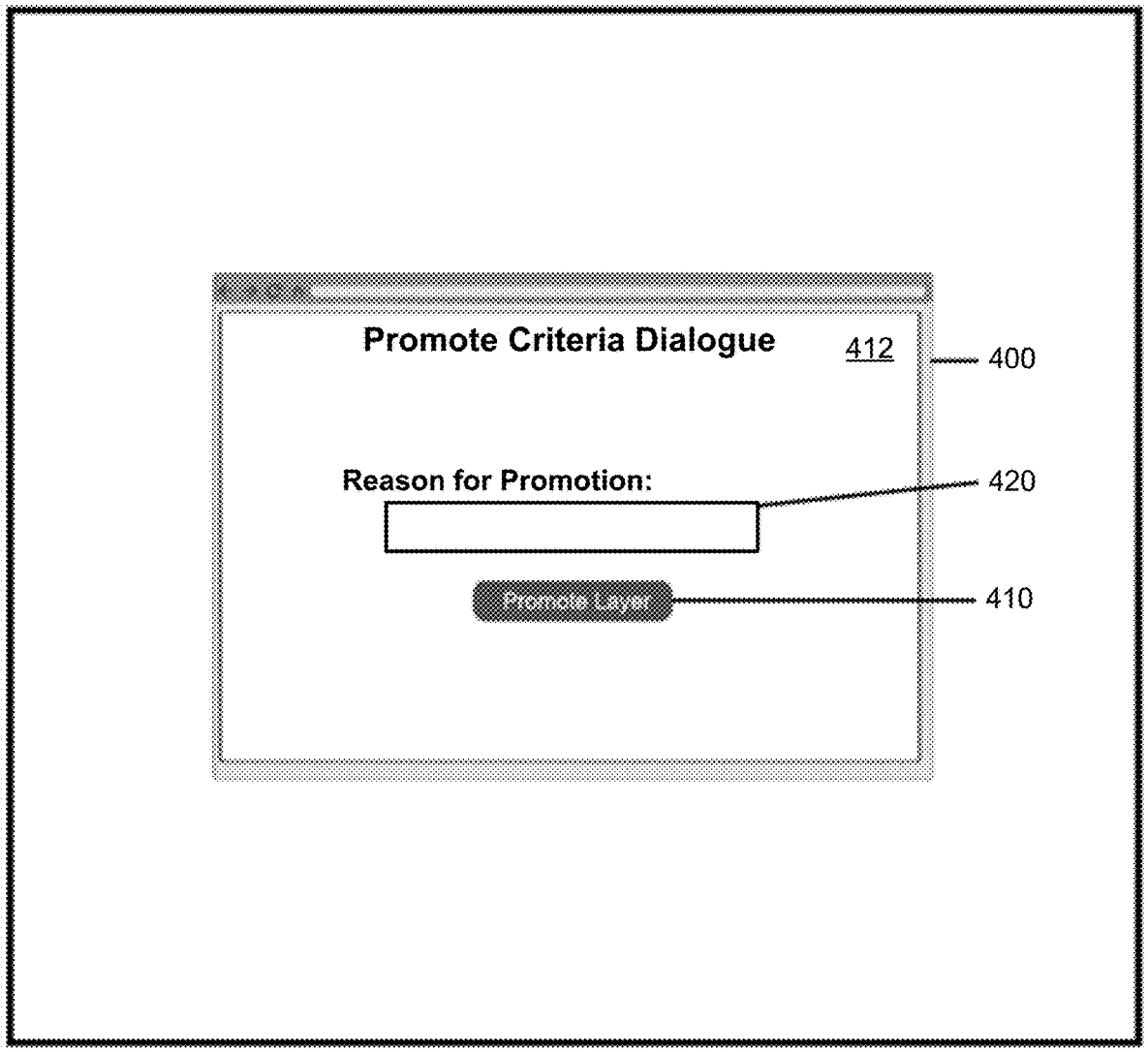
FIG. 4 illustrates a graphical user interface that a user may use to promote the results to a "layer."

When the decision in decision block 1220 is "YES," in block 1222, the user 1312 submits or promotes the results into the Tier Score engine 1344 (see FIG. 13) for consideration as a "layer." Referring to FIG. 4, the user 1312 may use their mouse to launch a graphical user interface 400 (e.g., a dialogue window). The graphical user interface 400 prompts the user 1312 to confirm that the results should be considered a "layer" by the Tier Score engine 1344. The graphical user interface 400 includes a user input 410 (e.g., a "Promote Layer" button) that the user 1312 may use to indicate that the query results should be considered a "layer" by the Tier Score engine 1344. Above the user input 410, a form 412 prompts the user 1312 to enter a description of why the query result is relevant to the legal matter, or a "reason for promotion" into an input field 420. For example, for a Boolean search for "price AND (increase OR decrease)," the user 1312 may enter a description of "Search hits for pricing fluctuations" into the input field 420. The input field 420 may be implemented as a text entry box. The value input into the input field 420 may be characterized as being a layer description and may be stored in the Promotion Reason field 1342 (see FIG. 13).

Figure 5:
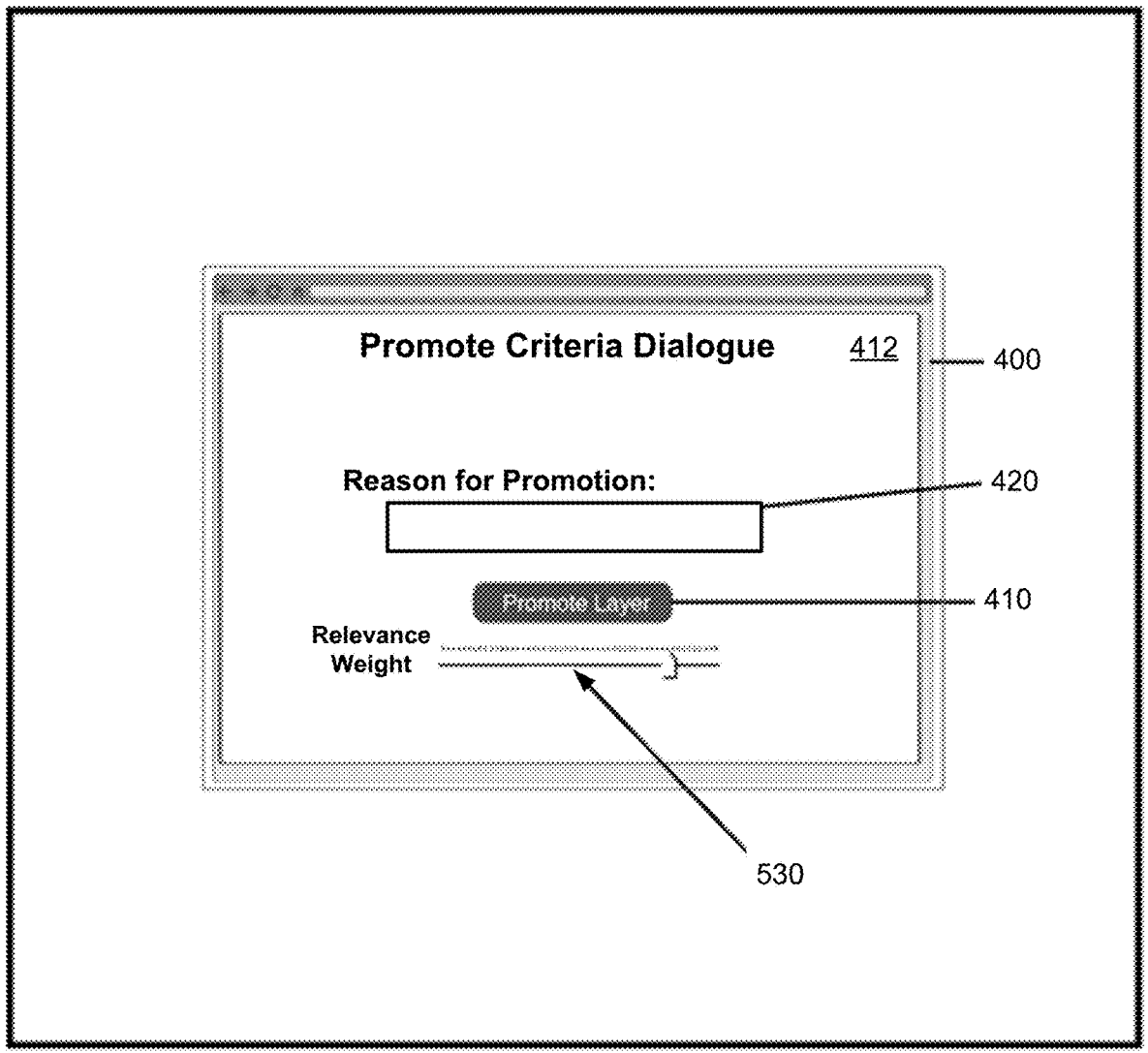
FIG. 5 illustrates the graphical user interface of FIG. 4 including a Relevance Weight user input that the user may use to assign a numerical value to a relevance weight for the layer.

Optionally, referring to FIG. 5, the graphical user interface 400 may include a user input 530 (e.g., labeled "Relevance Weight"). The user input 530 may be implemented as an entry box, a slider, or a toggle. The user 1312 may use the user input 530 to assign a numerical value to a relevance weight. The value of the relevance weight indicates the relative importance of the relevance criteria or the "layer," and is factored into a Tier Score calculation described below. For example, the value of the relevance weight may be a multiplier in the Tier Score calculation, enabling the user to increase or decrease the influence of each relevance criteria. The value of the relevance weight may be bound by a range (e.g., from 0 to 100). The value of the relevance weight may be stored in the relevance weight field 1346 (see FIG. 13).

After completing the graphical user interface 400, the user 1312 selects (e.g., clicks on) the user input 410 (e.g., a "Promote Layer" button) to promote the results to a layer. Then, the graphical user interface 400 may close. As mentioned above, the text string entered in the input field 420 may be passed to the searchable database 1308 and stored in the Promotion Reason field 1342 for all documents within the "layer." As the user 1312 promotes different results to layers, the text strings entered in the input field 420 are added to the Promotion Reason field 1342. Thus, the Promotion Reason field 1342 stores a history of how many times and the reasons why each document was promoted.

Then, the Tier Score engine 1344 advances to block 1226. In block 1226, the Tier Score engine 1344 updates the Tier Scores of the documents in the results, which means the Tier Score field 1340 of each document within the promoted layer is updated. Equation 1 below may be used to update the Tier Score field 1340. In the Equation 1, a variable "$TS_O$" represents a value of a current Tier Score, a variable "$TS_N$" represents a value of a new Tier Score, and the relevance weight variable "$\alpha$" represents a relevance weight.

$$TS_N = TS_O + \alpha \qquad \text{Equation 1}$$

The Tier Scores may be updated using uniform weighting or user-defined weighting.

When uniform weighting is used, the value of the relevance weight variable "$\alpha$" is set to a constant value (e.g., one) for each document in each promoted layer. For example, the document corpus containing the documents assigned the Control Numbers 1-5 are listed in the leftmost column of Table B below and the default value (e.g., zero) assigned to their Tier Scores are shown in the second column from the left of Table B below. The rightmost two columns show the updated Tier Scores after the promotion of two different results.

The first promoted results were obtained from the criteria 1360 selected by the user 1312 and provided to the E-Discovery Platform 1330 in block 1214. For example, the criteria 1360 may have been a search string "fix w/2 price" for a Boolean search. In block 1218, the E-Discovery Platform 1330 performed the Boolean search and obtained the documents assigned the Control Numbers 1, 3, and 5 as "hits." Then, in block 1222, the user 1312 promoted (e.g., using the graphical user interface 400 illustrated in FIGS. 4 and 5) the documents assigned the Control Numbers 1, 3, and 5 to a layer because the user 1312 believed the presence of "fix w/2 price" indicated potential relevance. Then, in block 1226, the Tier Score engine 1344 updated the Tier Scores for the documents assigned Control Numbers 1, 3, and 5 using Equation 1 above. In this example, uniform weighting was used and the relevance weight variable "α" was set to one for each document in each promoted layer. In other words, the Tier Scores were updated to one ($TS_N=0+1=1$) for the documents assigned Control Numbers 1, 3, and 5. The Tier Scores for the documents assigned Control Numbers 2 and 4 remained at zero. These results are shown in the column second from the right in Table B below.

The second promoted search results were obtained from the criteria 1360 selected by the user 1312 and provided to the E-Discovery Platform 1330 in block 1214. For example, in block 1214, the user 1312 indicated that the user 1312 wanted to perform a cluster analysis. In block 1218, the E-Discovery Platform 1330 performed the cluster analysis and displayed results to the user 1312. In block 1222, the user 1312 selected a "cluster" of documents named "Dallas, Meeting, September" identified by the cluster analysis that appeared to contain potentially relevant documents and promoted the cluster (e.g., using the graphical user interface 400 illustrated in FIGS. 4 and 5) to a layer. This cluster included the documents assigned Control Numbers 1, 2, and 5. Then, in block 1226, the Tier Score engine 1344 updated the Tier Scores for the documents assigned Control Numbers 1, 2, and 5 using Equation 1 above. As mentioned above, uniform weighting was used and the relevance weight variable "α" was set to one for each document in each promoted layer. In other words, the Tier Scores were updated to two ($TS_N=1+1=2$) for the documents assigned Control Numbers 1 and 5 and to one ($TS_N=0+1=1$) for the document assigned Control Number 2. The Tier Scores for the documents assigned Control Numbers 3 and 4 remained at one and zero, respectively. These results are shown in the rightmost column of Table B below.

TABLE B

| Control No. | Before Promotions Tier Score | After First Promotion Tier Score | After Second Promotion Tier Score |
|---|---|---|---|
| 1 | 0 | 1 | 2 |
| 2 | 0 | 0 | 1 |
| 3 | 0 | 1 | 1 |
| 4 | 0 | 0 | 0 |
| 5 | 0 | 1 | 2 |

When user-defined weighting is used, the relevance weight variable "α" may be used to amplify the influence of more important layers. The user 1312 may specify the relevance weight for a particular layer using the user input 530 (see FIG. 5). The relevance weight variable "α" may have a value selected from within a fixed range of values (e.g., 1-10). For example, the document corpus containing the documents assigned the Control Numbers 1-5 are listed in the leftmost column of Table C below and the default value (e.g., zero) assigned to their Tier Scores are shown in the second column from the left of Table C below. The rightmost two columns show the updated Tier Scores after the first and second promoted search results have been obtained.

In this example, the user 1312 set the relevance weight variable "α" equal to eight after the first promotion because the user 1312 valued the criteria highly. The user 1312 may set the relevance weight variable "α" using the user input 530 (see FIG. 5) to eight (e.g., out of a maximum of 10). Thus, after the first promotion, the Tier Scores were updated to eight ($TS_N=0+8=8$) for the documents assigned Control Numbers 1, 3, and 5. The Tier Scores for the documents assigned Control Numbers 2 and 4 remained at zero.

Based on the user's understanding of the case facts, the cluster criteria appear to be somewhat relevant, but not as highly relevant as the previous Boolean search. Therefore, the user 1312 set the relevance weight variable "α" equal to three for the second promotion. Thus, after the second promotion, the Tier Scores were updated to 11 ($TS_N=8+3=11$) for the documents assigned Control Numbers 1 and 5 and to three ($TS_N=0+3=3$) for the document assigned Control Number 2. The Tier Scores for the documents assigned Control Numbers 3 and 4 remained at eight and zero, respectively. These results are shown in the rightmost column of Table C below.

TABLE C

| Control No. | Before Promotions Tier Score | After First Promotion Tier Score | After Second Promotion Tier Score |
|---|---|---|---|
| 1 | 0 | 8 | 11 |
| 2 | 0 | 0 | 3 |
| 3 | 0 | 8 | 8 |
| 4 | 0 | 0 | 0 |
| 5 | 0 | 8 | 11 |

After block 1226, the user 1312 advances to decision block 1230.

When the decision in decision block 1220 is "NO," the user 1312 advances to decision block 1242. In decision block 1242, the user 1312 decides whether the results obtained in block 1218 should be demoted. Often, querying the corpus 1320 for non-relevant documents can be an effective way of removing false positives from a pool of potentially relevant results. Removing false positives improves the precision value. Queries for non-relevance focus on identifying documents that have no value to the legal matter, with the intent of eliminating them from the subset of the corpus 1320 that will undergo human review prior during the human review phase. Often, queries for non-relevance target spam, interoffice chatter, programmatic files, configuration files, and documents that do not relate to the relevant legal issues.

While a promoted document can be a false positive for one query, it is unlikely that a false positive will "survive" the multiple layers of relevance queries that would allow the document to attain a high Tier Score. Therefore, many irrelevant documents are eliminated at block 1222 where relevant documents are escalated or promoted. However, before the demotion phase implemented by decision block 1242 and block 1246, a number of false positives may remain scattered throughout the layers. To address false positives, decision block 1242 gives the user 1312 the option to reduce (e.g., to a value of zero) the Tier Score of the documents in the result.

The decision in decision block 1242 is "YES" when the user 1312 decides to demote the results. On the other hand, the decision in decision block 1242 is "NO" when the user 1312 decides not to demote the results.

Figure 6:
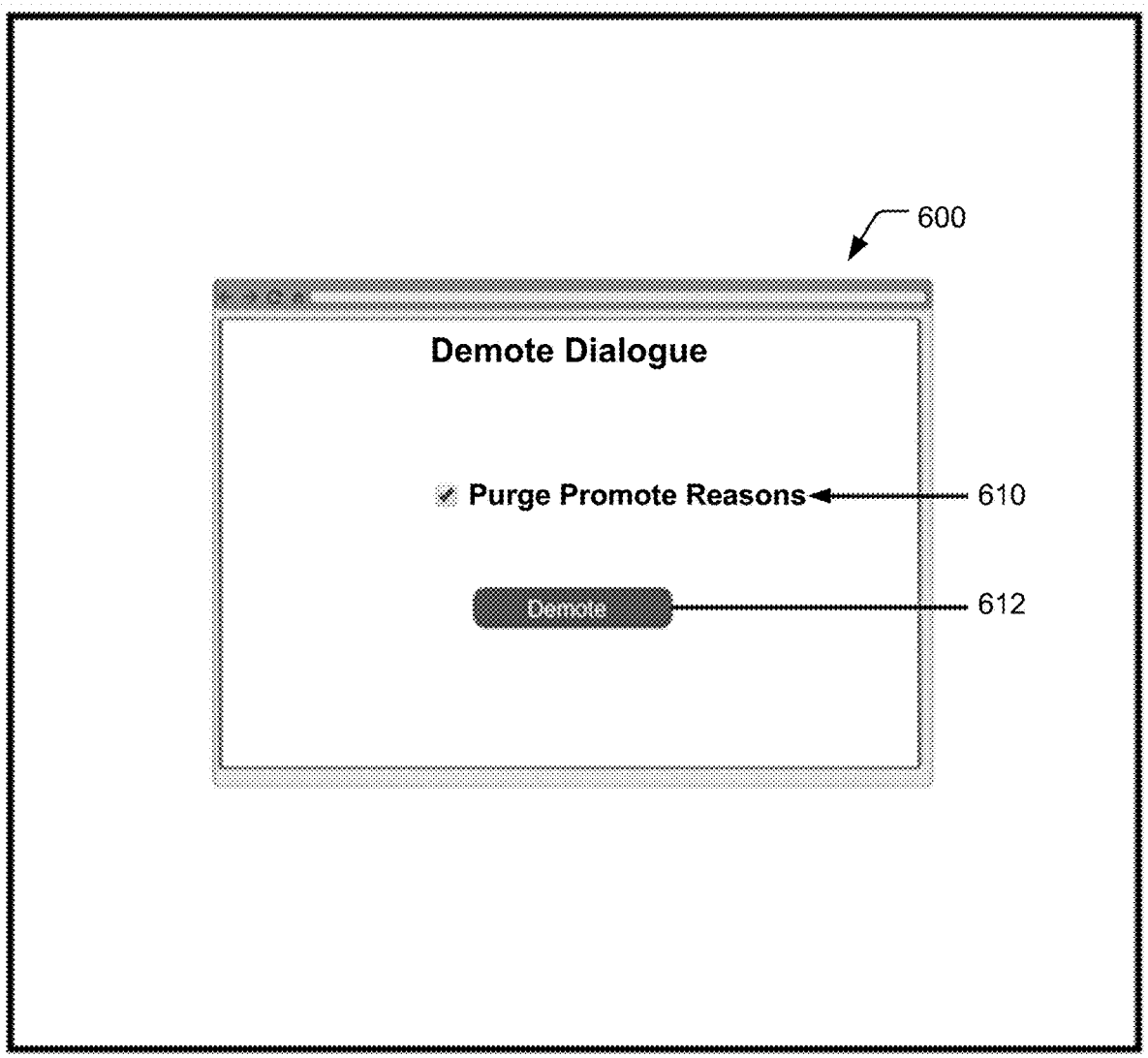
FIG. 6 illustrates an example Demote Dialogue window that the user may use to demote the results.

When the decision in decision block 1242 is "YES," the user 1312 communicates the decision to demote the results to the Tier Score Engine 1344 in decision block 1242. FIG. 6 illustrates an example Demote Dialogue window 600 that the user 1312 may launch with the user's mouse. The Demote Dialogue window 600 may include a form with two user inputs 610 and 612. The user input 610 prompts the user 1312 to confirm that the results should be considered irrelevant. For example, the user input 610 may include a text message (e.g., "Purge Promote Reasons") alongside a check box or similar user input. The user input 610 prompts the user 1312 to decide whether to clear the "reason for promotion" previously entered into the input field 420 (see FIG. 4) and stored in the Promotion Reasons field 1342 (see FIG. 13). For example, in decision block 1242, the user 1312 may indicate the results are to be demoted by selecting the user input 610 (e.g., checking the box), which empties the Promotion Reason field 1342 (see FIG. 13) for all documents in the results. Clearing the Promotion Reason field 1342 (see FIG. 13) for non-relevant documents may be valuable from a housekeeping perspective. However, in some instances, preserving the reasons for promotion may be useful from an audit trail perspective. Therefore, the user input 610 allows this determination to be made by the user 1312. The user input 612 prompts the user 1312 to confirm that the Tier Scores of the results should be demoted (e.g., set to zero). In the example illustrated, the user input 612 is implemented as a button labeled "Demote." Selecting (e.g., clicking on) the user input 612 submits the form of the Demote Dialogue window 600 and the Demote Dialogue window 600 closes.

Then, in block 1246, the Tier Score engine 1344 demotes the Tier Scores of the documents in the results. When the criteria 1360 is non-relevance criteria, the criteria 1360 must typically be "absolute." If a document is a positive hit for a query targeting non-relevant documents, the document may be considered completely irrelevant, as opposed to slightly less relevant. In such embodiments, instead of reducing the Tier Score incrementally (e.g. reducing the Tier Score by one), the Tier Score engine 1344 may reduce the Tier Score to zero using Equation 2. In the Equation 2, the variable "$TS_O$" represents the value of the current Tier Score and the variable "$TS_N$" represents the value of the new Tier Score.

$$TS_N = (TS_O) \cdot 0 \qquad \text{Equation 2}$$

For example, the document corpus containing the documents assigned the Control Numbers 1-5 are listed in the leftmost column of Table D below and the default value (e.g., zero) assigned to their Tier Scores are shown in the second column from the left of Table D below. Then, after results of one or more document identifying operations have been promoted as one or more layers, the Tier Scores are updated and listed in the second rightmost column in Table D below.

The demoted search results are obtained from the criteria 1360 selected by the user 1312 and provided to the E-Discovery Platform 1330 in block 1214. For example, the criteria 1360 may be a search string "weekly newsletter" for a Boolean search, which the user 1312 believes will identify non-relevant documents that were false positive hits for one or more document identifying operations that were promoted as layers. In block 1218, the E-Discovery Platform 1330 performed the Boolean search and obtained the documents assigned the Control Numbers 1 and 4 as "hits." In decision block 1242, the user 1312 indicated that the user 1312 wanted to demote the result. This may be achieved by the user 1312 opening the Demote Dialogue window 600, optionally selecting the user input 610, and selecting the user input 612. Then, in block 1246, the Tier Score engine 1344 updated the Tier Scores for the documents assigned Control Numbers 1 and 4 using Equation 2 above. In other words, the Tier Scores were updated to zero for the documents assigned Control Numbers 1 and 4. The Tier Scores for the documents assigned Control Numbers 2, 3, and 5 remained 13, 2, and 94, respectively. These results are shown in the rightmost column of Table D below.

TABLE D

| Control No. | Before Promotions Tier Score | After Promotion(s) Tier Score | After Demotion Tier Score |
|---|---|---|---|
| 1 | 0 | 47 | 0 |
| 2 | 0 | 13 | 13 |
| 3 | 0 | 2 | 2 |
| 4 | 0 | 11 | 0 |
| 5 | 0 | 94 | 94 |

While Equation 2 has been described as being used to update the Tier Score field 1340 when the results are demoted in block 1246, in alternate embodiments, other calculations may be used. For example, in block 1246, the Tier Score Engine 1344 may reduce the Tier Scores of the results of a query targeting non-relevant documents by a predetermined value (e.g., one) or a user defined weight.

Then, the Tier Score Engine 1344 advances to block 1226.

When the decision in decision block 1242 is "NO," in block 1248, the Tier Score Engine 1344 ignores or discards the results and advances to decision block 1230.

In decision block 1230, the user 1312 decides whether to continue performing document identifying operations. The decision in decision block 1230 is "YES," when the user 1312 decides to continue performing document identifying operations. Otherwise, the decision in decision block 1230 is "NO."

When the decision in decision block 1230 is "YES," the user 1312 returns to block 1214. During the ECA phase, multiple potential criteria for relevance are established based on best estimations of key timeframes, individuals, terminology, and other case facts. In addition, known conceptual analytics and machine learning technologies may be used to retrieve potentially relevant sets of documents based on human input (usually through a seed set of example documents). Often, numerous criteria are applied through multiple methods. Thus, a loop including blocks 1214, 1218, 1220, 1222, 1226, 1230, 1242, 1246, and 1248 may be repeated a number of times.

When the decision in decision block 1230 is "NO," the Tier Score engine 1344 advances to optional block 1234. In embodiments that omit optional block 1234, the Tier Score engine 1344 advances to block 1238.

In optional block 1234, the Tier Score engine 1344 may update or convert the Tier Scores into percentages using Equation 3 below. In other words, in optional block 1234, the Tier Score engine 1344 generates Tier Scores as a percentage within a range from 0% to 100%. The Tier Scores may be represented and/or displayed as numerical values each having a value from 0 to 100. A Tier Score of 100 means that the document is a positive hit for all relevance criteria submitted to the Tier Score engine 1344 and was not demoted in block 1246. Such a continuum of scores from 0 to 100 may be more intuitive to the user 1312 when analyzing the Tier Scores.

In the Equation 3, the variable "TS" represents the value of the updated Tier Score, the variable "$TS_0$" represents the value of the current Tier Score, the variable "$TS_N$" represents the value of the new Tier Score, the variable "$TS_{MAX}$" represents the maximum value of the variable "$TS_N$", and the relevance weight variable "α" represents the relevance weight.

$$TS = 100 \cdot \left(\frac{TS_N}{TS_{MAX}}\right) = 100 \cdot \left(\frac{TS_0 + \alpha}{TS_{MAX}}\right) \quad \text{Equation 3}$$

For example, the middle column of Table E below illustrates the values of the variable "$TS_N$" for the documents assigned Control Nos. 1-5. The values of the variable "TS," which represent the Tier Scores, calculated using Equation 3 are shown in the rightmost column of Table E below. Thus, the values in the rightmost column are obtained by dividing each of the values in the middle column by the maximum value (e.g., 11) in the middle column and then multiplying this quotient by 100.

TABLE E

| Control No. | Tier Score | Tier Score (%) |
|---|---|---|
| 1 | 11 | 100 |
| 2 | 3 | 27.3 |
| 3 | 8 | 72.7 |
| 4 | 0 | 0 |
| 5 | 11 | 100 |

While in FIG. 12, the Tier Score engine 1344 optionally updates or converts the Tier Scores into percentages after decision block 1230, in alternate embodiments, the Tier Scores may be updated or converted into percentages after block 1226 and before decision block 1230. In such embodiments, the optional block 1234 is omitted.

Then, in block 1238, the Tier Score engine 1344 displays the Tier Scores or values based on the Tier Scores to the user 1312. For example, the Tier Score engine 1344 may display the grid display 300 of FIG. 3 to the user 1312. The grid display 300 may be an interactive graphical user interface ("GUI") that includes two columns 312 and 314 and one row per Tier Score. The left-hand column 312 displays the Tier Scores numerically in descending order from top to bottom. The right-hand column 314 displays a numerical document count associated with each Tier Score. Initially before any results have been promoted to layers, the grid display 300 displays one row with the Tier Score equal to the default value (e.g., zero). The grid display 300 may be configured to or include one or more links that display the same information graphically (e.g., in a pie chart, histogram, or the like). Selecting (e.g., clicking on) one of the Tier Scores returns those documents having the selected Tier Score to the user 1312.

Figure 7:
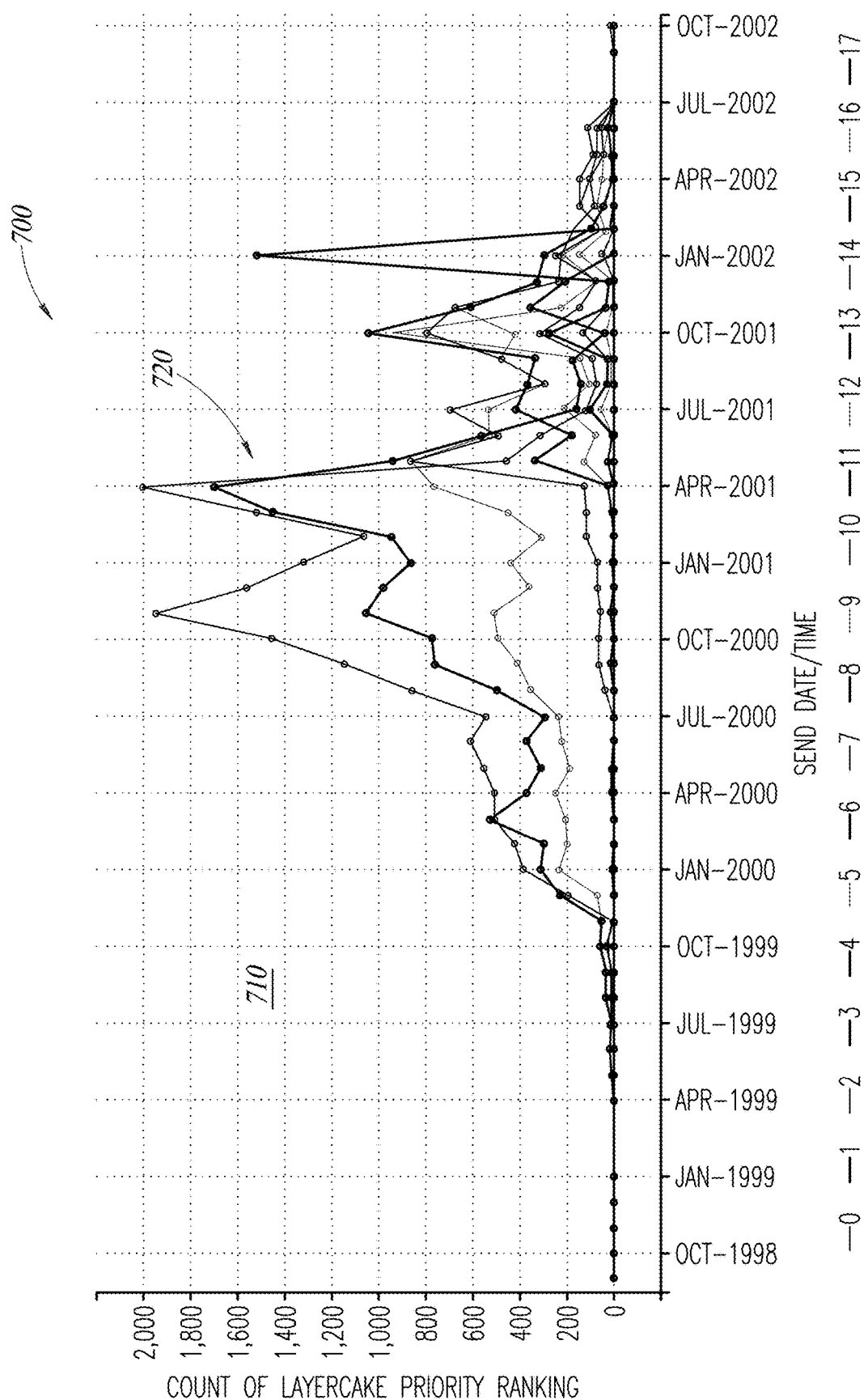
FIG. 7 illustrates a Tier Score Timeline.

By way of yet another non-limiting example, in block 1238, the Tier Score engine 1344 may display a Tier Score Timeline 700 (see FIG. 7) to the user 1312. Referring to FIG. 7, the Tier Score Timeline 700 may be an interactive GUI consisting of a line graph 710 in which the frequency of occurrence of each Tier Score is plotted as one of lines 720 over time. In the line graph 710, the x-axis displays time ascending from left to right. The value of time along the x-axis may be determined for each of the documents based on the value stored in the timestamp metadata field 1329 (see FIG. 13). For each document, the timestamp metadata field 1329 may store a date on which the document was created, sent, modified, or the like. The y-axis is the document count. Each of the lines 720 represents a Tier Score or a range of Tier Scores. The lines 720 may be distinguished from one another by color. The Tier Score Timeline 700 reveals key timeframes during which the highest concentration of documents with a high Tier Score were created or sent based on metadata timestamps (e.g., stored in the timestamp metadata field 1329). The user 1312 may use the Tier Score Timeline 700 to filter the results by selecting (e.g., clicking on) a particular timeframe and/or a particular Tier Score. Understanding key timeframes may contribute to a better understanding of the case facts and/or the litigation.

By way of yet another non-limiting example, referring to FIG. 12, in block 1238, the Tier Score engine 1344 (see FIG. 13) may display a grid or chart 800 (see FIG. 8) to the user 1312 (see FIG. 13) listing the Tier Scores (e.g., in descending order from top to bottom) per Custodian. Referring to FIG. 8, the chart 800 may be an interactive GUI that correlates the number of hits for each Tier Score with each document owner or Custodian (e.g., stored in the custodian metadata field 1328 within searchable database 1308). A leftmost column 810 of the chart 800 may list the Tier Scores and one or more other columns 812-819 of the chart 800 may each represent a different Custodian. One or more rows of the chart 800 each represent a different Tier Score. Numerical entries in cells of the chart 800 indicate numbers of documents in each Custodian's possession that have each of the Tier Scores. The chart 800 indicates to the user 1312 (see FIG. 13) which of the Custodians were in possession of the most relevant documents to the legal matter, which may be useful in understanding the case facts and when litigating the case. Selecting (e.g., clicking on) a particular Custodian will filter the results to include only the specified Custodian's document set. Selecting (e.g., clicking on) a particular Tier Score will filter the results to include only documents within the selected Tier Score.

Figure 9:
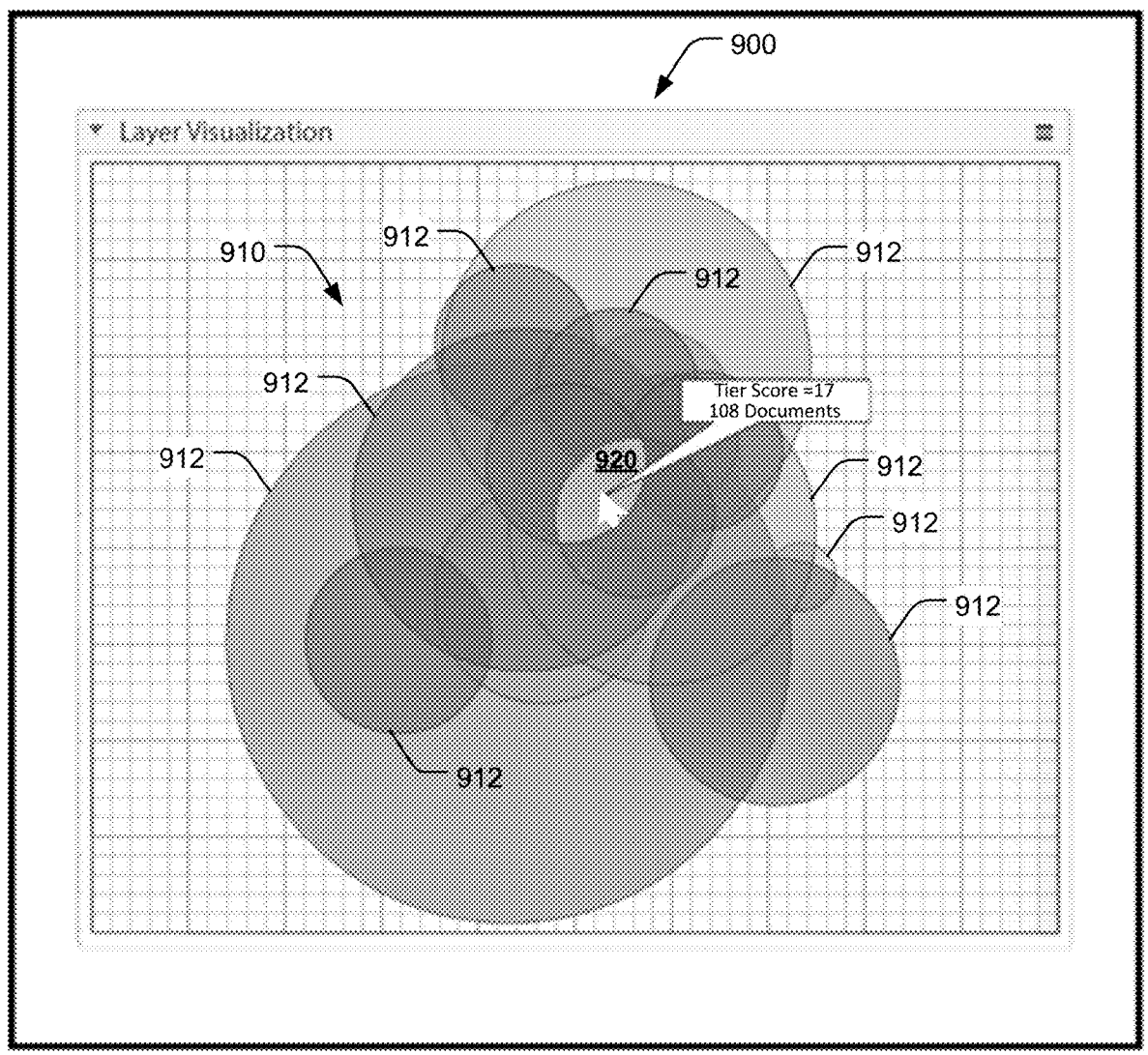
FIG. 9 illustrates a Venn Visualization of the layer(s) promoted by the user.

By way of yet another non-limiting example, referring to FIG. 12, in block 1238, the Tier Score engine 1344 (see FIG. 13) may display a Venn Visualization 900 (see FIG. 9) of the layer(s) to the user 1312. Referring to FIG. 9, the Venn Visualization 900 may be an interactive GUI consisting of a Venn diagram 910 that illustrates each individual query (or "layer") as a different ring 912 of the Venn diagram 910. The Venn diagram 910 allows the user 1312 (see FIG. 13) to visualize overlap between different layers, which are responsible for the Tier Score. The Venn diagram 910 may be configured to allow the user 1312 to navigate easily between the Tier Scores based on different combinations of queries. By selecting (e.g., clicking on) a "slice" or region 920 of the overlapping rings 912 in the Venn diagram 910, the user 1312 may be presented with a subset of documents that are hits for the queries represented by those overlapping rings or information about the subset of documents. For example, in FIG. 9, the user 1312 has selected the region 920 of the Venn diagram 910, which caused the Venn diagram 910 to display a message including the Tier Score (e.g., 17) and the number of documents (e.g., 108) located by all of the queries represented by those of the rings 912 that overlap with the region 920.

By way of yet another non-limiting example, in block 1238, Table F below may be displayed to the user 1312. The leftmost column of Table F below illustrates bins each representing 10% of the Tier Scores, and the rightmost column lists a number of documents within each of the bins. For example, the second row of Table F shows that five documents have Tier Scores that are equal to 100 and the third row of Table F shows that 13 documents have Tier Scores that are less than 100 and greater than or equal to 90. Each of the rows of Table F may be characterized as being a tier. A tier may include one or more Tier Score values.

TABLE F

| Tier Score | Document Count |
| --- | --- |
| 100 | 5 |
| 90 | 13 |
| 80 | 34 |
| 70 | 97 |
| 60 | 310 |
| 50 | 902 |
| 40 | 3,235 |
| 30 | 88,501 |
| 20 | 356,241 |
| 10 | 459,250 |
| 0 | 1,234,944 |

Documents in high tiers with high Tier Scores are positive hits for one or more different relevance queries and were not demoted. Documents in low tiers with low Tier Scores were positive hits for fewer queries, and documents having a Tier Score of zero did not meet any criteria for relevance set forth by the user 1312 (or were demoted by the user in block 1246).

Referring to FIG. 11, the graphics 1110-1116 of the dashboard interface 1100 may be updated with the Tier Scores and associated information. In other words, the dashboard interface 1100 may be populated. In such embodiments, the graphic 1110 may include the visualization 100 (see FIG. 1), the graphic 1112 may include the Tier Score Timeline 700 (see FIG. 7), the graphic 1114 may include the chart 800 (see FIG. 8), and the graphic 1116 may include the Venn Visualization 900 (see FIG. 9). Alternatively, as mentioned above, information of the grid display 300 (see FIG. 3) may be displayed graphically (e.g., in a pie chart, histogram, or the like). In such embodiments, the graphic 1110 may include the Venn Visualization 900 (see FIG. 9), the graphic 1112 may include the Tier Score Timeline 700 (see FIG. 7), the graphic 1114 may include the histogram (not shown), and the graphic 1116 may include the pie chart (not shown).

At this point, the user 1312 has established Tier Scores that capture all identified relevance criteria, and eliminate false positives by demoting the Tier Scores of those documents believed not to be relevant. Thus, the scoring phase for the document corpus 1320 has been completed. Next, referring to FIG. 12, in optional block 1240, the user 1312 may use the Tier Scores to prioritize the documents during the human review phase.

Generally speaking, fewer documents attain a higher Tier Score (e.g., 100) than a lower Tier Score (e.g., 10). For example, the second row of Table F is a highest or top tier, which includes those documents having Tier Scores that are equal to 100, and the bottom row is a lowest or bottom tier, which includes those documents having Tier Scores that are less than 10 and greater than or equal to 0. As shown in Table F, the bottom tier includes 1,234,944 documents, which is more documents than the other tiers combined.

A high Tier Score (e.g., greater than 80) indicates that a document is a positive hit for most or all relevance criteria set forth by the user 1312. In practical terms, these are the potential "smoking guns" and are likely the most highly valuable documents in the legal matter. A lower Tier Score (e.g., less than 40) indicates that a document was a positive hit for at most a few of the relevance queries.

The user 1312 may use the Table F above or a similar display to organize the document corpus 1320 based on the Tier Scores in preparation for the human review phase. For example, the user 1312 may sort the document corpus 1320 by Tier Score in descending order from highest Tier Score (e.g., 100) to lowest Tier Score (e.g., 0). Those of the documents with the highest Tier Scores are promoted for human review first. The user 1312 may determine a predefined "stopping criteria" for the human review. The "stopping criteria" is meant to establish a point at which the user 1312 is confident that all relevant documents have been identified. The "stopping criteria" may be defined using the recall rate and the precision value (described below), or other statistical validation methods, like an elusion test.

Thus, the documents may be inspected by the review team 1314 (see FIG. 13) in descending order based on the Tier Scores assigned to the documents. This means the documents in the top tier are inspected first, followed by the documents in the next highest tier and so forth. The user 1312 may exclude one or more of the lowest tiers from human review. Thus, the user 1312 may select a set of the documents for review based on the Tier Scores. The Tier Score engine 1344 may automatically determine the order in which the documents are reviewed by the review team 1314 (see FIG. 13).

For example, the leftmost column of Table G below illustrates bins each representing 10% of the Tier Scores, the middle column lists a number of documents within each of the bins, and the rightmost column indicates whether documents within each of the tiers is going to be inspected by the review team 1314 (see FIG. 13). An empty row between tiers 30 and 40 in Table G illustrates a stopping point for the human review. The corpus illustrated in Table G includes 2,143,532 documents but only 4,596 documents are above the stopping point and will be reviewed by the review team 1314 (see FIG. 13) during the human review phase.

TABLE G

| Tier Score | Document Count | Human Review |
| --- | --- | --- |
| 100 | 5 | Yes |
| 90 | 13 | Yes |
| 80 | 34 | Yes |
| 70 | 97 | Yes |
| 60 | 310 | Yes |
| 50 | 902 | Yes |
| 40 | 3,235 | Yes |
| 30 | 88,501 | No |
| 20 | 356,241 | No |
| 10 | 459,250 | No |
| 0 | 1,234,944 | No |

After optional block 1240, the method 1200 terminates.

The method 1200 may improve upon the traditional method in three ways. First, instead of binary "good pile" and "bad pile" results, the user 1312 is able to classify the document corpus 1320 (see FIG. 13) according to the Tier Scores (e.g., 1-100). Second, the user 1312 is able to quickly identify key pockets of documents unearthed by the user 1312 having defined the appropriate document identifying operations. Third, the user 1312 is able to perform analytics by plotting the Tier Scores against other variables. For example, the user 1312 may use the Tier Score Timeline 700 to plot the frequency of occurrence of each Tier Score over time using a metadata timestamp (e.g., stored in the timestamp metadata field 1329), which will reveal timeframes when the most relevant documents were created. Additionally, the user 1312 can plot the Tier Score against other fields. For example, the user 1312 may use the chart 800 (see FIG. 8) or a display based on the information of the chart 800 to view the Tier Scores per Custodian. By way of another non-limiting example, the user 1312 can plot the Tier Score against an "Email From" metadata field 1326 to reveal which email senders were most involved in the case issues.

By identifying the relevant documents, the method 1200 avoids unnecessary network traffic associated with transferring non-relevant documents to the reviewer computing device(s) 1307. This savings can be significant when the size of the corpus 1320 is large. The method 1200 also avoids unnecessary database operations required to obtain the non-relevant documents and track information related to the non-relevant documents input by the review team 1314. In many cases, 95%-99% of the documents collected for a legal matter are irrelevant. By reducing the total data volume of the documents subject to human review, the method 1200 reduces the volume of sensitive data that must be transmitted and stored by law firms and corporations, which reduces the risk of data breach and exposure of Personally Identifiable Information ("PII"), Protected Health Information ("PHI"), and/or other forms of private and confidential information.

After the method 1200 terminates and before the human review phase, a statistical validation method may be performed to ensure that a reasonably high percentage of relevant documents have been identified. For example, an $F_1$ Score is a metric calculated using both the recall rate and the precision value. Measuring the recall rate and the precision value is an industry standard methodology used to validate a binary classification.

Referring to FIG. 13, to calculate the $F_1$ Score the user 1312 may use the E-Discovery Platform 1330 to open the target document corpus 1320. Then, the user 1312 uses the E-Discovery Platform 1330 to run a random sampling operation and retrieve a random subset of the document corpus 1320. The number of documents in the sample population can be determined by the user 1312 based on desired inputs for Confidence Level and Margin of Error according to standard Bell Curve guidelines for a random sampling from a binary population.

Next, the user 1312 performs a human review of each sampled document, and determines whether each document is relevant or irrelevant to the case. These determinations will be referred to as being human relevance determinations. As mentioned above, the Tier Scores may be used to determine whether the method 1200 (see FIG. 12) determined that each sampled document is relevant or irrelevant to the case. For example, documents assigned a Tier Score greater than the stopping point (e.g., 40) may be considered relevant and documents assigned a Tier Score less than the stopping point may be considered irrelevant. These determinations will be referred to as being Tier Score relevance determinations. While the stopping point has been described as being determined by the user 1312, in alternate embodiments, the Tier Score engine 1344 may automatically set the stopping point. Then, the E-Discovery Platform 1330 uses the human relevance determinations and the Tier Score relevance determinations to determine whether each document was a true positive (meaning the document was correctly identified as being relevant by the Tier Score relevance determination), a true negative (meaning the document was correctly identified as being irrelevant by the Tier Score relevance determination), a false positive (meaning the document was incorrectly identified as being relevant by the Tier Score relevance determination), and a false negative (meaning the document was incorrectly identified as being irrelevant by the Tier Score relevance determination). Then, the E-Discovery Platform 1330 sums the documents to obtain the following values:

1. True Positives (represented by a variable "$T_P$"), which is a total count of the documents that the human relevance determinations and the Tier Score relevance determinations agree are relevant;
2. True Negatives (represented by a variable "$T_N$"), which is a total count of the documents that the human relevance determinations and the Tier Score relevance determinations agree are not relevant;
3. False Positives (represented by a variable "$F_P$"), which is a total count of the documents that the Tier Score relevance determinations determined are relevant, but the human relevance determinations found are irrelevant; and
4. False Negatives (represented by a variable "$F_N$"), which is a total count of the documents that the Tier Score relevance determinations determined are irrelevant, but the human relevance determinations found are relevant.

FIG. 1 is a visualization 100 of the recall rate and the precision value. In FIG. 1, solid circles and rings represent documents in the corpus 1320. The solid circles represent relevant documents and the rings represent irrelevant or non-relevant documents. A line 104 separates the relevant documents from the non-relevant documents in the corpus 1320. A circle 102 represents search results. The documents counted as True Positives are represented by a shaded area 110 inside the circle 102. The documents counted as True Negatives are represented by a shaded area 112 outside the circle 102. The documents counted as False Positives are represented by an unshaded area 114 inside the circle 102. The documents counted as False Negatives are represented by an unshaded area 116 outside the circle 102.

The recall rate is the True Positives (represented by the shaded area 110) divided by a total of the True Positives and the False Negatives (represented by the shaded area 110 and the unshaded area 116, respectively). Thus, the E-Discovery Platform 1330 calculates the recall rate according to Equation 4 below.

$$\text{Recall} = \frac{T_P}{T_p + F_n} \quad \text{Equation 4}$$

The precision value is the True Positives (represented by the shaded area 110) divided by a total of the True Positives and the False Positives (represented by the shaded area 110 and the unshaded area 114, respectively). Thus, the E-Discovery Platform 1330 calculates the precision value according to Equation 5 below. Using this formula, the precision value equals 1.0 when all relevant documents within the larger document corpus have been identified without generating any false positives, meaning zero documents are within the unshaded area 114.

$$\text{Precision} = \frac{T_P}{T_p + F_p} \quad \text{Equation 5}$$

The F₁ Score is twice the product of the recall rate and the precision value divided by a sum of the recall rate and the precision value. Thus, the E-Discovery Platform 1330 calculates the F₁ Score according to Equation 6 below.

$$F_1 Score = 2 \cdot \frac{\left(\frac{T_P}{T_p + F_n}\right) \cdot \left(\frac{T_P}{T_p + F_P}\right)}{\left(\frac{T_P}{T_p + F_n}\right) + \left(\frac{T_P}{T_p + F_P}\right)} \quad \text{Equation 6}$$

The E-Discovery Platform 1330 may present the recall rate, the precision value, and the F₁ Score as numerical values to the user 1312. The method 1200 (see FIG. 12) has been shown to deliver higher recall rates, precision values, and F₁ Scores than traditional document retrieval approaches that precede human review.

After the method 1200 (see FIG. 12) terminates, the human review phase may be performed. As explained above, the method 12 assigns Tier Scores to the documents and may identify a set of the documents for human review (e.g., those documents assigned Tier Scores greater than the stopping point). The documents may be organized by their Tier Scores into tier and reviewed starting with the highest tier first. Thus, after completing the human review of the documents in the highest tier, the review team 1314 begins reviewing the documents in the next highest tier and so forth until the review team 1314 reaches the stopping point.

As the review team 1314 reviews lower-tiered documents, the prevalence of relevant documents decreases. The review team 1314 may set, reset, and/or confirm the stopping point. For example, the review team 1314 may determine it has reached the stopping point when the review team 1314 satisfies pre-defined "stopping criteria." By way of a non-limiting example, the stopping criteria may specify that the stopping point has been reached when the review team 1314 is no longer identifying any relevant documents. In such embodiments, the stopping point occurs when the human review stops identifying relevant documents. In this manner, fewer than all of the documents require human review and fewer documents are reviewed than when using traditional methods.

Referring to FIG. 13, during the human review phase, the review team 1314 uses the Review Platform 1336 to inspect each document and apply final relevance designations to each. In other words, the review team 1314 inspects each document, which is presented to the user 1312 through the document viewer application 1303. When viewing a document, the Tier Score engine 1344 may present any information or tags stored in the Promotion Reason field 1342 to the review team 1314. Presenting the Promotion Reason field 1342, which stores the "Reasons for Promotion" input into the user input 420 (see FIGS. 4 and 5), offers the review team 1314 a heads-up explanation as to why the document is potentially relevant and a full audit-trail of each occurrence when the document was promoted.

The method 1200 (see FIG. 12) accelerates the traditional E-Discovery workflow by eliminating irrelevant documents from the corpus prior to the human review phase. In other words, the document corpus 1320 is ultimately classified into two sets:

1. Positive (or Relevant) Set, which includes documents with a Tier Score sufficiently high that they require human review; and 2. Negative (or Non-Relevant) Set, which includes documents with a Tier Score sufficiently low that they do not require human review.

Referring to FIG. 13, after the human review phase, the Tier Score engine 1344 may display one or more Custom Pivot Comparisons (not shown) to the user 1312 (see FIG. 13). The Custom Pivot Comparison(s) may each be an interactive GUI consisting of a grid, chart, or table in which the Tier Score is plotted against any user-defined metadata attribute, tag, or database field is displayed to the user. The Custom Pivot Comparison(s) allow the user 1312 to reveal key relationships between the occurrence of highly relevant documents and other document properties. For example, the review team 1314 may identify or tag issues included in the documents during the human review phase. The tagged issues may be stored in the issues metadata field 1327. When such issue tagging was performed, the user 1312 may plot the Tier Scores against the issues stored in the issues metadata field 1327 to reveal which issues correspond to the most highly relevant documents in the corpus 1320. The review team 1314 may identify values of other metadata fields during the human review phase that may be used to generate Custom Pivot Comparison(s) or other types of displays.

Figure 10:
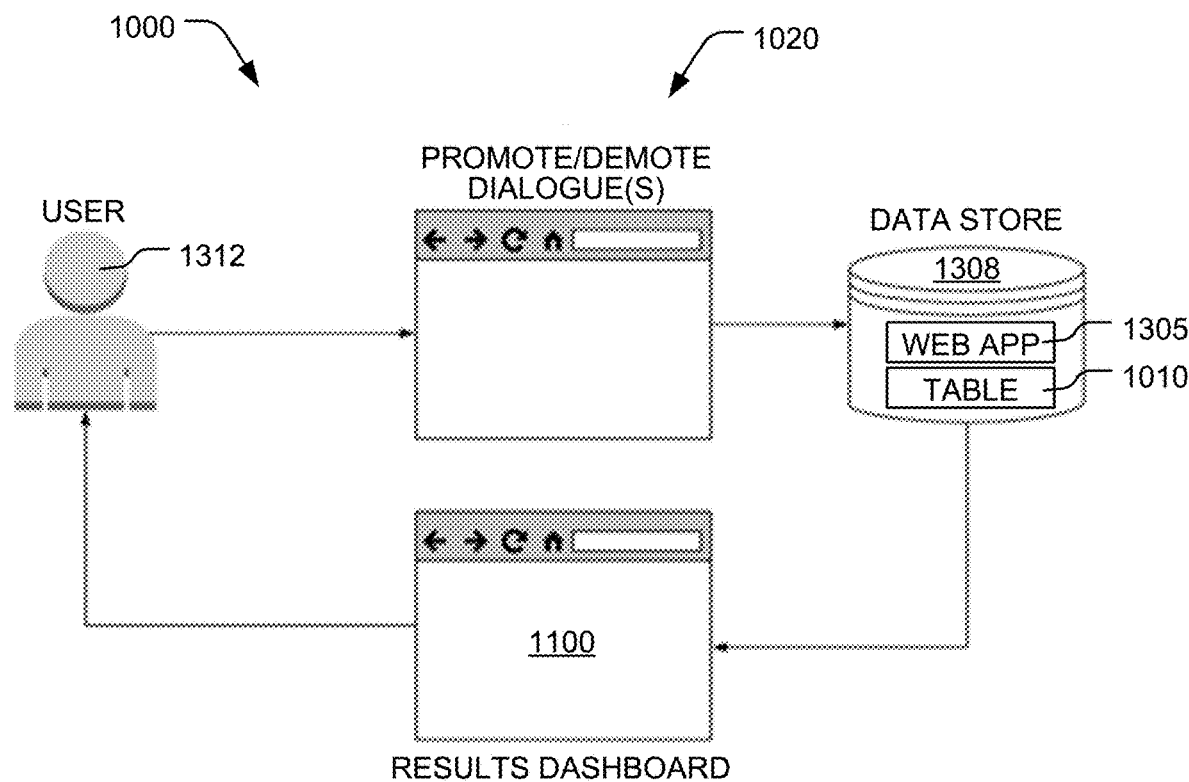
FIG. 10 illustrates an example implementation of a portion of a method of FIG. 12 and a portion of a system of FIG. 13.

FIG. 10 illustrates an example implementation 1000 of a portion of the method 1200 (see FIG. 12) and a portion of the system 1300 (see FIG. 13). In the implementation 1000, the server 1306 (see FIG. 13) is omitted and the web application 1305 is implemented by the searchable database 1308 (labeled "data store"). In the implementation 1000, in block 1214 (see FIG. 12), the user 1312 uses the web browser 1309 (see FIG. 13) to specify the criteria 1360 (see FIG. 13) to the web application 1305. Then, in block 1218 (see FIG. 12), the web application 1305 communicates the criteria 1360 to the E-Discovery Platform 1330 (see FIG. 13) and the E-Discovery Platform 1330 obtains the results. Thus, the web application 1305 causes the E-Discovery Platform 1330 (see FIG. 13) to perform a mass selection of records in a database table component 1010 of the searchable database 1308.

At this point, the web application 1305 generates an interface 1020 that is displayed to the user 1312 by the web browser 1309 (see FIG. 13). The interface 1020 may require that the user 1312 perform a first action that causes the web application 1305 to display a first custom web page (e.g., the graphical user interface 400 illustrated in FIGS. 4 and 5) that allows the user 1312 to promote the results to a layer, or a second action that causes the web application 1305 to display a second custom web page (e.g., the Demote Dialogue window 600 illustrated in FIG. 6) that allows the user 1312 to demote the results.

When the user 1312 promotes or demotes the results, the web application 1305 triggers an update statement that causes the Tier Score engine 1344 (see FIG. 13) to update the value of the Tier Score field 1340 (see FIG. 13) for each of the documents included in the results. Whenever the value of the Tier Score field 1340 would be updated to less than zero, the value is set to zero.

The interface 1020 displays the Tier Scores and/or other analytic results based on the Tier Scores to the user 1312. For example, the interface 1020 may display the dashboard interface 1100 and/or other analytic dashboards to the user 1312 that allow the user 1312 to visualize the Tier Scores and/or values based on the Tier Scores. For example, the interface 1020 may display the Tier Score results dashboard 310, the Tier Score Timeline 700, the chart 800, and/or the Venn Visualization 900 to the user 1312.

Computing Device

Figure 14:
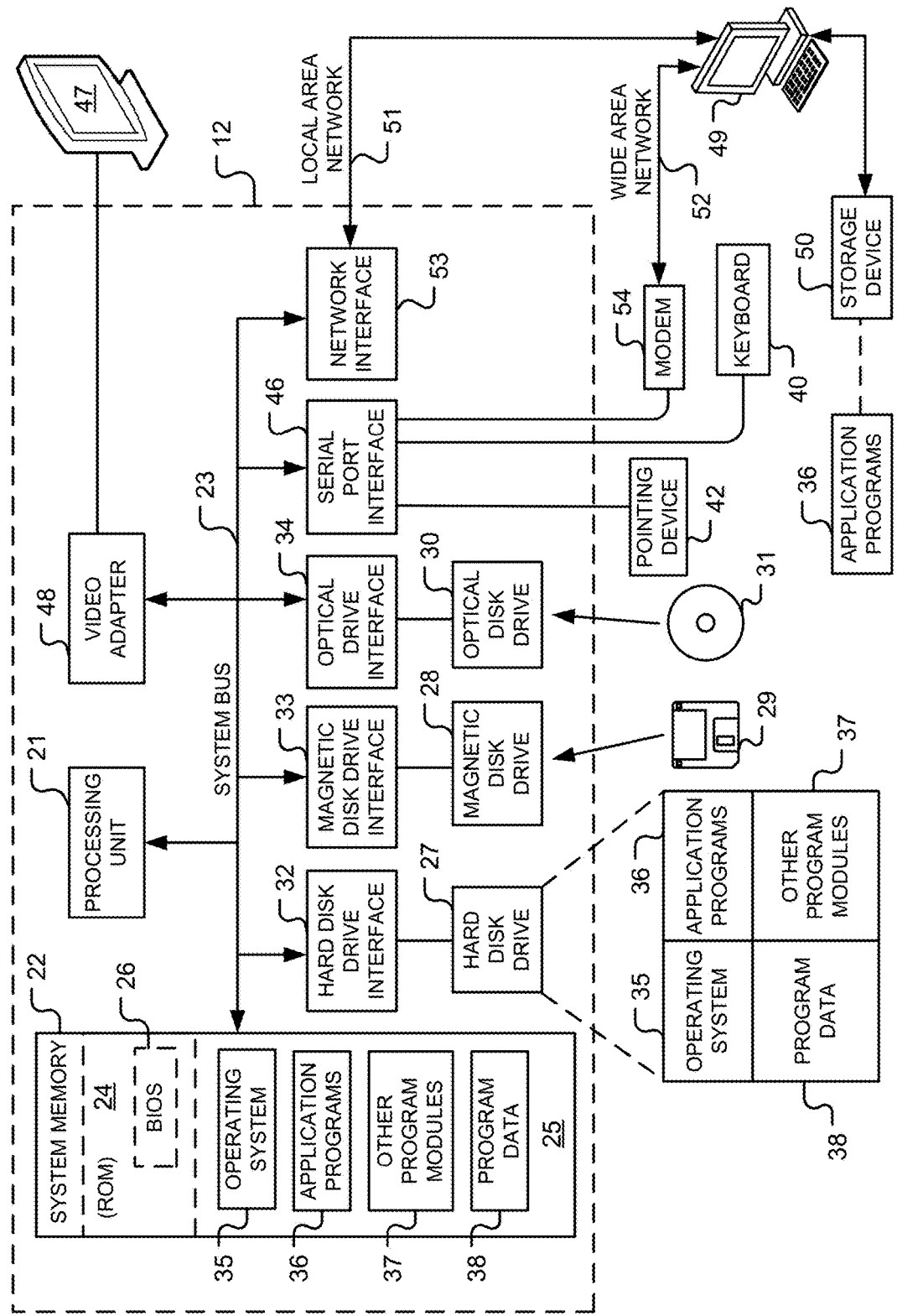
FIG. 14 is a diagram of a hardware environment and an operating environment in which computing devices of the system of FIG. 13 may be implemented.

FIG. 14 is a diagram of hardware and an operating environment in conjunction with which implementations of the one or more computing devices of the system 1300 (see FIG. 13) may be practiced. The description of FIG. 14 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 14 includes a general-purpose computing device in the form of the computing device 12. Each of the computing devices of FIG. 13 (including the client computing device 1302, the server 1306, the reviewer computing device(s) 1307, and the searchable database 1308) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 14 include a local-area network (LAN) 51 and a wide-area network (WAN) 52. Such networking environments are commonplace in offices, enterprise-wide computer networks, intranets, and the Internet. The network 1310 (see FIG. 13) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the method 1200 illustrated in FIG. 12) described above. Such instructions may be stored on one or more non-transitory computer-readable media.

In some embodiments, the system memory 22 stores computer executable instructions that when executed by one or more processors cause the one or more processors to generate the visualization 100, the Tier Score results dashboard 310, the graphical user interface 400, the graphical user interface 400, the Demote Dialogue window 600, the Tier Score Timeline 700, the chart 800, the Venn Visualization 900, and the dashboard interface 1100 illustrated in FIGS. 1, 3, 4, 5, 6, 7, 8, 9, and 11, respectively, and described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A computer-implemented method comprising:
performing, by at least one computing system, a document identifying operation on a document corpus comprising a plurality of documents, the document identifying operation identifying results comprising one or more of the plurality of documents, the plurality of documents being associated one each with a plurality of numeric tier scores;
calculating, by the at least one computing system, each tier score in a portion of the plurality of numeric tier scores, the portion of the plurality of numeric tier scores being identified based on the results;
receiving, by the at least one computing system, a selection of a stopping point;
organizing, by the at least one computing system, the plurality of documents into tiers based at least in part on the plurality of numeric tier scores, the tiers being ranked from most relevant to least relevant,
using, by the at least one computing system, the stopping point to identify which of the tiers are in a relevant portion and which of the tiers are in a non-relevant portion, the relevant portion comprising the most relevant of the tiers, the non-relevant portion comprising the least relevant of the tiers; and
sending, by the at least one computing system, any of the tiers in the relevant portion one at a time to one or more reviewer computing devices in an order determined by the ranking, the order sending the most relevant of the tiers to the one or more reviewer computing devices first, any of the tiers in the non-relevant portion not being sent to one or more reviewer computing devices.

2. The computer-implemented method of claim 1, further comprising:
displaying, by the at least one computing system, information associated with the tiers in a graphical user interface.

3. The computer-implemented method of claim 1, wherein calculating each tier score in the portion of the plurality of numeric tier scores comprises:
adding a relevance weight to each tier score in the portion of the plurality of numeric tier scores.

4. The computer-implemented method of claim 3, further comprising:
receiving, by the at least one computing system, the relevance weight as user input.

5. The computer-implemented method of claim 1, wherein the document identifying operation is a relevance operation, the results are relevance results, and the computer-implemented method further comprises:
setting, by the at least one computing system, the plurality of numeric tier scores equal to identical default numerical values before the document identifying operation is performed;
performing, by the at least one computing system, a non-relevance operation on the document corpus that identifies, as non-relevance results, at least one of the plurality of documents; and
setting, by the at least one computing system, each of the plurality of numeric tier scores associated with the at least one document equal to the identical default numerical values before the plurality of documents are organized into the tiers.

6. The computer-implemented method of claim 1, wherein the document identifying operation is a relevance operation, the results are relevance results, and the computer-implemented method further comprises:
performing, by the at least one computing system, a non-relevance operation on the document corpus that identifies, as non-relevance results, at least one of the plurality of documents; and
reducing, by the at least one computing system, each of the plurality of numeric tier scores associated with the at least one document before the plurality of documents are organized into the tiers.

7. The computer-implemented method of claim 1, wherein the document identifying operation is a document search and the computer-implemented method further comprises:
receiving, by the at least one computing system, search criteria used to perform the document search.

8. The computer-implemented method of claim 1, wherein the at least one computing system stores the document corpus as a data set,
the data set is structured or unstructured,
the document identifying operation comprises at least one query, and
performing the document identifying operation comprises performing the at least one query on the data set.

9. The computer-implemented method of claim 1, wherein the document identifying operation is a cluster analysis and the computer-implemented method further comprises:
receiving, by the at least one computing system, a selection of at least one cluster identified by the cluster analysis, the at least one cluster comprising the one or more documents that are identified as the results.

10. The computer-implemented method of claim 1, wherein the document identifying operation is an automated machine learning method that automatically selects the one or more documents that are identified as the results.

11. A system comprising at least one processor and memory storing processor executable instructions that when executed by the at least one processor perform a method comprising:
performing a plurality of document identifying operations on a document corpus comprising a plurality of documents, each of the plurality of document identifying operations identifying corresponding results comprising one or more of the plurality of documents, the plurality of documents being associated one each with a plurality of numeric tier scores;
after each of the plurality of document identifying operations, adding a relevance weight to any of the plurality of numeric tier scores associated with the one or more documents of the corresponding results;
organizing the plurality of documents into tiers based on the plurality of numeric tier scores, the tiers being ranked from a highest one of the plurality of numeric tier scores to a lowest one of the plurality of numeric tier scores to thereby define a review order;
receiving a stopping point from a client computing device, the stopping point having been entered into the client computing device as user input; and
sending the tiers one at time and in accordance with the review order to one or more reviewer computing devices until the stopping point is reached to thereby avoid sending any of the plurality of documents associated with lower tier scores to the one or more reviewer computing devices.

12. The system of claim 11, wherein the method further comprises:
after sending each of the tiers in accordance with the review order to the one or more reviewer computing devices, (a) determining whether information related to any of the plurality of documents in the tier has been received from any of the one or more reviewer computing devices, and (b) determining the stopping point has been reached when no information related to any of the plurality of documents in the tier has been received from any of the one or more reviewer computing devices.

13. The system of claim 11, wherein the method further comprises:
receiving the relevance weight from the client computing device after each of the plurality of document identifying operations, the relevance weight having been entered into the client computing device as user input.

14. The system of claim 11, wherein the method further comprises:
setting the plurality of numeric tier scores equal to identical default numerical values before the plurality of document identifying operations are performed;
performing a non-relevance operation on the document corpus before the plurality of documents are organized into the tiers, the non-relevance operation identifying, as non-relevance results, at least one of the plurality of documents; and
setting each of the plurality of numeric tier scores associated with the at least one document equal to the identical default numerical values before the plurality of documents are organized into the tiers.

15. The system of claim 11, wherein the method further comprises:
performing a non-relevance operation on the document corpus before the plurality of documents are organized into the tiers, the non-relevance operation identifying, as non-relevance results, at least one of the plurality of documents; and
reducing each of the plurality of numeric tier scores associated with the at least one document before the plurality of documents are organized into the tiers.

16. The system of claim 11, wherein the method further comprises:
generating a graphical user interface with information associated with the tiers; and
transmitting the graphical user interface to the client computing device for display thereby.

17. The system of claim 11, wherein the method further comprises:
performing a statistical validation method configured to determine whether a reasonably high percentage of relevant documents are included in those of the plurality of documents sent to the one or more reviewer computing devices.

18. A computer-implemented method for use with a document corpus comprising a plurality of documents, the computer-implemented method comprising:
associating, by at least one computing system, each of the plurality of documents with a tier score to thereby define a plurality of numeric tier scores;
receiving, by the at least one computing system, user-defined criteria related to at least one document identifying operation;
performing, by the at least one computing system, the at least one document identifying operation on the document corpus, the at least one document identifying operation identifying results comprising one or more of the plurality of documents;
displaying, by the at least one computing system, a graphical user interface allowing a user to demote or promote the results;
receiving, by the at least one computing system, an indication from the graphical user interface indicating that the user is demoting or promoting the results;
when the indication indicates that the user is promoting the results, increasing, by the at least one computing system, any of the plurality of numeric tier scores associated with the one or more documents of the results;
when the indication indicates that the user is demoting the results, decreasing, by the at least one computing system, any of the plurality of numeric tier scores associated with the one or more documents of the results;
organizing the plurality of documents into tiers based on the plurality of numeric tier scores having a review order;
receiving, by the at least one computing system, a selection of a stopping point; and
sending the tiers one at time and in accordance with the review order to one or more reviewer computing devices until the stopping point is reached.

19. The computer-implemented method of claim 18, wherein, before the plurality of documents is organized into the tiers, the at least one computing system revises, at least once, a portion of the plurality of numeric tier scores by:
receiving new user-defined criteria related to at least one new document identifying operation,
performing the at least one new document identifying operation on the document corpus, the at least one new document identifying operation identifying new results comprising a portion of the plurality of documents,
displaying the graphical user interface, which allows the user to demote or promote the new results,
receiving a new indication from the graphical user interface indicating that the user is demoting or promoting the new results,
increasing any of the plurality of numeric tier scores associated with the portion of the documents of the new results when the new indication indicates that the user is promoting the new results, and
decreasing any of the plurality of numeric tier scores associated with the portion of the documents of the new results when the new indication indicates that the user is demoting the new results.

20. The computer-implemented method of claim 18, further comprising:
displaying, by the at least one computing system, information associated with the tiers in the graphical user interface.

21. The computer-implemented method of claim 18, wherein each of any of the plurality of numeric tier scores associated with the one or more documents of the results is increased by a relevance weight when the indication indicates that the user is promoting the results.

22. The computer-implemented method of claim 21, further comprising:
receiving, by the at least one computing system, the relevance weight as user input.

23. The computer-implemented method of claim 18, wherein each of any of the plurality of numeric tier scores associated with the one or more documents of the results is set equal to a default numerical value when the indication indicates that the user is demoting the results.

24. The computer-implemented method of claim 23, further comprising:
setting, by the at least one computing system, each of the plurality of numeric tier scores equal to the default numerical value before the at least one document identifying operation is performed.

25. A computer-implemented method comprising:
performing, by at least one computing system, a document identifying operation on a document corpus comprising a plurality of documents, the document identifying operation identifying results comprising one or more of the plurality of documents, the plurality of documents being associated one each with a plurality of numeric tier scores;
calculating, by the at least one computing system, each tier score in a portion of the plurality of numeric tier scores, the portion of the plurality of numeric tier scores being identified based on the results, wherein calculating each tier score in the portion of the plurality of numeric tier scores comprises adding a relevance weight to each tier score in the portion of the plurality of numeric tier scores;
organizing, by the at least one computing system, the plurality of documents into tiers based at least in part on the plurality of numeric tier scores, the tiers being ranked from most relevant to least relevant, the tiers comprising a relevant portion and a non-relevant portion, the relevant portion comprising the most relevant of the tiers, the non-relevant portion comprising the least relevant of the tiers; and
sending, by the at least one computing system, any of the tiers in the relevant portion one at a time to one or more reviewer computing devices in an order determined by the ranking, the order sending the most relevant of the tiers to the one or more reviewer computing devices first, any of the tiers in the non-relevant portion not being sent to one or more reviewer computing devices.

26. The computer-implemented method of claim 25, further comprising:
displaying, by the at least one computing system, information associated with the tiers in a graphical user interface.

27. The computer-implemented method of claim 25, further comprising:
receiving, by the at least one computing system, the relevance weight as user input.

28. The computer-implemented method of claim 25, wherein the document identifying operation is a relevance operation, the results are relevance results, and the computer-implemented method further comprises:
setting, by the at least one computing system, the plurality of numeric tier scores equal to identical default numerical values before the document identifying operation is performed;
performing, by the at least one computing system, a non-relevance operation on the document corpus that identifies, as non-relevance results, at least one of the plurality of documents; and
setting, by the at least one computing system, each of the plurality of numeric tier scores associated with the at least one document equal to the identical default numerical values before the plurality of documents are organized into the tiers.

29. The computer-implemented method of claim 25, wherein the document identifying operation is a relevance operation, the results are relevance results, and the computer-implemented method further comprises:
performing, by the at least one computing system, a non-relevance operation on the document corpus that identifies, as non-relevance results, at least one of the plurality of documents; and
reducing, by the at least one computing system, each of the plurality of numeric tier scores associated with the at least one document before the plurality of documents are organized into the tiers.

30. The computer-implemented method of claim 25, wherein the document identifying operation is a document search and the computer-implemented method further comprises:
receiving, by the at least one computing system, search criteria used to perform the document search.

31. The computer-implemented method of claim 25, wherein the at least one computing system stores the document corpus as a data set,
the data set is structured or unstructured,
the document identifying operation comprises at least one query, and
performing the document identifying operation comprises performing the at least one query on the data set.

32. The computer-implemented method of claim 25, wherein the document identifying operation is a cluster analysis and the computer-implemented method further comprises:
receiving, by the at least one computing system, a selection of at least one cluster identified by the cluster analysis, the at least one cluster comprising the one or more documents that are identified as the results.

33. The computer-implemented method of claim 25, wherein the document identifying operation is an automated machine learning method that automatically selects the one or more documents that are identified as the results.

34. A computer-implemented method comprising:
setting, by the at least one computing system, a plurality of numeric tier scores equal to identical default numerical values;
performing, by at least one computing system, a relevance operation on a document corpus comprising a plurality of documents after the plurality of numeric tier scores are set equal to the identical default numerical values, the relevance operation identifying relevance results comprising one or more of the plurality of documents, the plurality of documents being associated one each with the plurality of numeric tier scores;
performing, by the at least one computing system, a non-relevance operation on the document corpus that identifies, as non-relevance results, at least one of the plurality of documents;
calculating, by the at least one computing system, each tier score in a portion of the plurality of numeric tier scores, the portion of the plurality of numeric tier scores being identified based on the relevance results;
setting, by the at least one computing system, each of the plurality of numeric tier scores associated with the at least one document equal to the identical default numerical values;
organizing, by the at least one computing system, the plurality of documents into tiers based at least in part on the plurality of numeric tier scores after each of the plurality of numeric tier scores associated with the at least one document are set equal to the identical default numerical values, the tiers being ranked from most relevant to least relevant, the tiers comprising a relevant portion and a non-relevant portion, the relevant portion comprising the most relevant of the tiers, the non-relevant portion comprising the least relevant of the tiers; and sending, by the at least one computing system, any of the tiers in the relevant portion one at a time to one or more reviewer computing devices in an order determined by the ranking, the order sending the most relevant of the tiers to the one or more reviewer computing devices first, any of the tiers in the non-relevant portion not being sent to one or more reviewer computing devices.

35. The computer-implemented method of claim 34, further comprising:

displaying, by the at least one computing system, information associated with the tiers in a graphical user interface.

36. The computer-implemented method of claim 34, wherein calculating each tier score in the portion of the plurality of numeric tier scores comprises adding a relevance weight to each tier score in the portion of the plurality of numeric tier scores, and the computer-implemented method further comprises receiving, by the at least one computing system, the relevance weight as user input.

37. The computer-implemented method of claim 34, wherein the relevance operation is a document search and the computer-implemented method further comprises:

receiving, by the at least one computing system, search criteria used to perform the document search.

38. The computer-implemented method of claim 34, wherein the at least one computing system stores the document corpus as a data set, the data set is structured or unstructured, the relevance operation comprises at least one query, and performing the relevance operation comprises performing the at least one query on the data set.

39. The computer-implemented method of claim 34, wherein the relevance operation is a cluster analysis and the computer-implemented method further comprises:

receiving, by the at least one computing system, a selection of at least one cluster identified by the cluster analysis, the at least one cluster comprising the one or more documents that are identified as the relevance results.

40. The computer-implemented method of claim 34, wherein the relevance operation is an automated machine learning method that automatically selects the one or more documents that are identified as the relevance results.

41. A computer-implemented method comprising:

performing, by at least one computing system, a relevance operation on a document corpus comprising a plurality of documents, the relevance operation identifying relevance results comprising one or more of the plurality of documents, the plurality of documents being associated one each with a plurality of numeric tier scores;

performing, by the at least one computing system, a non-relevance operation on the document corpus that identifies, as non-relevance results, at least one of the plurality of documents;

calculating, by the at least one computing system, each tier score in a portion of the plurality of numeric tier scores, the portion of the plurality of numeric tier scores being identified based on the relevance results;

reducing, by the at least one computing system, each of the plurality of numeric tier scores associated with the at least one document;

organizing, by the at least one computing system, the plurality of documents into tiers based at least in part on the plurality of numeric tier scores after reducing each of the plurality of numeric tier scores associated with the at least one document, the tiers being ranked from most relevant to least relevant, the tiers comprising a relevant portion and a non-relevant portion, the relevant portion comprising the most relevant of the tiers, the non-relevant portion comprising the least relevant of the tiers; and sending, by the at least one computing system, any of the tiers in the relevant portion one at a time to one or more reviewer computing devices in an order determined by the ranking, the order sending the most relevant of the tiers to the one or more reviewer computing devices first, any of the tiers in the non-relevant portion not being sent to one or more reviewer computing devices.

42. The computer-implemented method of claim 41, further comprising:

displaying, by the at least one computing system, information associated with the tiers in a graphical user interface.

43. The computer-implemented method of claim 41, wherein calculating each tier score in the portion of the plurality of numeric tier scores comprises adding a relevance weight to each tier score in the portion of the plurality of numeric tier scores, and the computer-implemented method further comprises receiving, by the at least one computing system, the relevance weight as user input.

44. The computer-implemented method of claim 41, wherein the relevance operation is a document search and the computer-implemented method further comprises:

receiving, by the at least one computing system, search criteria used to perform the document search.

45. The computer-implemented method of claim 41, wherein the at least one computing system stores the document corpus as a data set, the data set is structured or unstructured, the relevance operation comprises at least one query, and performing the relevance operation comprises performing the at least one query on the data set.

46. The computer-implemented method of claim 41, wherein the relevance operation is a cluster analysis and the computer-implemented method further comprises:

receiving, by the at least one computing system, a selection of at least one cluster identified by the cluster analysis, the at least one cluster comprising the one or more documents that are identified as the relevance results.

47. The computer-implemented method of claim 41, wherein the relevance operation is an automated machine learning method that automatically selects the one or more documents that are identified as the relevance results.

48. A computer-implemented method comprising:

performing, by at least one computing system, a cluster analysis on a document corpus comprising a plurality of documents, the plurality of documents being associated one each with a plurality of numeric tier scores;

receiving, by the at least one computing system, a selection of at least one cluster identified by the cluster analysis, the at least one cluster comprising one or more documents of the plurality of documents that are identified as results;

calculating, by the at least one computing system, each tier score in a portion of the plurality of numeric tier scores, the portion of the plurality of numeric tier scores being identified based on the results;

organizing, by the at least one computing system, the plurality of documents into tiers based at least in part on the plurality of numeric tier scores, the tiers being ranked from most relevant to least relevant, the tiers comprising a relevant portion and a non-relevant portion, the relevant portion comprising the most relevant of the tiers, the non-relevant portion comprising the least relevant of the tiers; and sending, by the at least one computing system, any of the tiers in the relevant portion one at a time to one or more reviewer computing devices in an order determined by the ranking, the order sending the most relevant of the tiers to the one or more reviewer computing devices first, any of the tiers in the non-relevant portion not being sent to one or more reviewer computing devices.

49. The computer-implemented method of claim 48, further comprising:

displaying, by the at least one computing system, information associated with the tiers in a graphical user interface.

50. The computer-implemented method of claim 48, wherein calculating each tier score in the portion of the plurality of numeric tier scores comprises adding a relevance weight to each tier score in the portion of the plurality of numeric tier scores, and the computer-implemented method further comprises receiving, by the at least one computing system, the relevance weight as user input.

51. A system comprising at least one processor and memory storing processor executable instructions that when executed by the at least one processor perform a method comprising:

performing a plurality of document identifying operations on a document corpus comprising a plurality of documents, each of the plurality of document identifying operations identifying corresponding results comprising one or more of the plurality of documents, the plurality of documents being associated one each with a plurality of numeric tier scores;

after each of the plurality of document identifying operations, adding a relevance weight to any of the plurality of numeric tier scores associated with the one or more documents of the corresponding results;

organizing the plurality of documents into tiers based on the plurality of numeric tier scores, the tiers being ranked from a highest one of the plurality of numeric tier scores to a lowest one of the plurality of numeric tier scores to thereby define a review order;

sending the tiers one at time and in accordance with the review order to one or more reviewer computing devices until a stopping point is reached to thereby avoid sending any of the plurality of documents associated with lower tier scores to the one or more reviewer computing devices; and after sending each of the tiers in accordance with the review order to the one or more reviewer computing devices, (a) determining whether information related to any of the plurality of documents in the tier has been received from any of the one or more reviewer computing devices, and (b) determining the stopping point has been reached when no information related to any of the plurality of documents in the tier has been received from any of the one or more reviewer computing devices.

52. The system of claim 51, wherein the method further comprises:

receiving the relevance weight from a client computing device after each of the plurality of document identifying operations, the relevance weight having been entered into the client computing device as user input.

53. The system of claim 51, wherein the method further comprises:

setting the plurality of numeric tier scores equal to identical default numerical values before the plurality of document identifying operations are performed;

performing a non-relevance operation on the document corpus before the plurality of documents are organized into the tiers, the non-relevance operation identifying, as non-relevance results, at least one of the plurality of documents; and setting each of the plurality of numeric tier scores associated with the at least one document equal to the identical default numerical values before the plurality of documents are organized into the tiers.

54. The system of claim 51, wherein the method further comprises:

performing a non-relevance operation on the document corpus before the plurality of documents are organized into the tiers, the non-relevance operation identifying, as non-relevance results, at least one of the plurality of documents; and reducing each of the plurality of numeric tier scores associated with the at least one document before the plurality of documents are organized into the tiers.

55. The system of claim 51, wherein the method further comprises:

generating a graphical user interface with information associated with the tiers; and transmitting the graphical user interface to a client computing device for display thereby.

56. The system of claim 51, wherein the method further comprises:

performing a statistical validation method configured to determine whether a reasonably high percentage of relevant documents are included in those of the plurality of documents sent to the one or more reviewer computing devices.

57. A system comprising at least one processor and memory storing processor executable instructions that when executed by the at least one processor perform a method comprising:

performing a plurality of document identifying operations on a document corpus comprising a plurality of documents, each of the plurality of document identifying operations identifying corresponding results comprising one or more of the plurality of documents, the plurality of documents being associated one each with a plurality of numeric tier scores;

after each of the plurality of document identifying operations, receiving a relevance weight from a client computing device and adding the relevance weight to any of the plurality of numeric tier scores associated with the one or more documents of the corresponding results, the relevance weight having been entered into the client computing device as user input;

organizing the plurality of documents into tiers based on the plurality of numeric tier scores, the tiers being ranked from a highest one of the plurality of numeric tier scores to a lowest one of the plurality of numeric tier scores to thereby define a review order; and sending the tiers one at time and in accordance with the review order to one or more reviewer computing devices until a stopping point is reached to thereby avoid sending any of the plurality of documents associated with lower tier scores to the one or more reviewer computing devices.

58. The system of claim 57, wherein the method further comprises:
setting the plurality of numeric tier scores equal to identical default numerical values before the plurality of document identifying operations are performed;
performing a non-relevance operation on the document corpus before the plurality of documents are organized into the tiers, the non-relevance operation identifying, as non-relevance results, at least one of the plurality of documents; and
setting each of the plurality of numeric tier scores associated with the at least one document equal to the identical default numerical values before the plurality of documents are organized into the tiers.

59. The system of claim 57, wherein the method further comprises:
performing a non-relevance operation on the document corpus before the plurality of documents are organized into the tiers, the non-relevance operation identifying, as non-relevance results, at least one of the plurality of documents; and
reducing each of the plurality of numeric tier scores associated with the at least one document before the plurality of documents are organized into the tiers.

60. The system of claim 57, wherein the method further comprises:
generating a graphical user interface with information associated with the tiers; and
transmitting the graphical user interface to the client computing device for display thereby.

61. The system of claim 57, wherein the method further comprises:
performing a statistical validation method configured to determine whether a reasonably high percentage of relevant documents are included in those of the plurality of documents sent to the one or more reviewer computing devices.

62. A system comprising at least one processor and memory storing processor executable instructions that when executed by the at least one processor perform a method comprising:
setting a plurality of numeric tier scores equal to identical default numerical values;
performing a plurality of document identifying operations on a document corpus comprising a plurality of documents after the plurality of numeric tier scores are set equal to the identical default numerical values, each of the plurality of document identifying operations identifying corresponding results comprising one or more of the plurality of documents, the plurality of documents being associated one each with the plurality of numeric tier scores;
after each of the plurality of document identifying operations, adding a relevance weight to any of the plurality of numeric tier scores associated with the one or more documents of the corresponding results;
performing a non-relevance operation on the document corpus, the non-relevance operation identifying, as non-relevance results, at least one of the plurality of documents;
setting each of the plurality of numeric tier scores associated with the at least one document equal to the identical default numerical values;
organizing the plurality of documents into tiers based on the plurality of numeric tier scores after the non-relevance operation is performed and each of the plurality of numeric tier scores associated with the at least one document are set equal to the identical default numerical values, the tiers being ranked from a highest one of the plurality of numeric tier scores to a lowest one of the plurality of numeric tier scores to thereby define a review order; and
sending the tiers one at time and in accordance with the review order to one or more reviewer computing devices until a stopping point is reached to thereby avoid sending any of the plurality of documents associated with lower tier scores to the one or more reviewer computing devices.

63. The system of claim 62, wherein the method further comprises:
generating a graphical user interface with information associated with the tiers; and
transmitting the graphical user interface to a client computing device for display thereby.

64. The system of claim 62, wherein the method further comprises:
performing a statistical validation method configured to determine whether a reasonably high percentage of relevant documents are included in those of the plurality of documents sent to the one or more reviewer computing devices.

65. A system comprising at least one processor and memory storing processor executable instructions that when executed by the at least one processor perform a method comprising:
performing a plurality of document identifying operations on a document corpus comprising a plurality of documents, each of the plurality of document identifying operations identifying corresponding results comprising one or more of the plurality of documents, the plurality of documents being associated one each with a plurality of numeric tier scores;
after each of the plurality of document identifying operations, adding a relevance weight to any of the plurality of numeric tier scores associated with the one or more documents of the corresponding results;
performing a non-relevance operation on the document corpus, the non-relevance operation identifying, as non-relevance results, at least one of the plurality of documents;
reducing each of the plurality of numeric tier scores associated with the at least one document;
organizing the plurality of documents into tiers based on the plurality of numeric tier scores after the non-relevance operation is performed and each of the plurality of numeric tier scores associated with the at least one document is reduced, the tiers being ranked from a highest one of the plurality of numeric tier scores to a lowest one of the plurality of numeric tier scores to thereby define a review order; and
sending the tiers one at time and in accordance with the review order to one or more reviewer computing devices until a stopping point is reached to thereby avoid sending any of the plurality of documents associated with lower tier scores to the one or more reviewer computing devices.

66. The system of claim 65, wherein the method further comprises:
generating a graphical user interface with information associated with the tiers; and transmitting the graphical user interface to a client computing device for display thereby.

67. The system of claim 65, wherein the method further comprises:
performing a statistical validation method configured to determine whether a reasonably high percentage of relevant documents are included in those of the plurality of documents sent to the one or more reviewer computing devices.

68. A system comprising at least one processor and memory storing processor executable instructions that when executed by the at least one processor perform a method comprising:
performing a plurality of document identifying operations on a document corpus comprising a plurality of documents, each of the plurality of document identifying operations identifying corresponding results comprising one or more of the plurality of documents, the plurality of documents being associated one each with a plurality of numeric tier scores;
after each of the plurality of document identifying operations, adding a relevance weight to any of the plurality of numeric tier scores associated with the one or more documents of the corresponding results;
organizing the plurality of documents into tiers based on the plurality of numeric tier scores, the tiers being ranked from a highest one of the plurality of numeric tier scores to a lowest one of the plurality of numeric tier scores to thereby define a review order;
sending the tiers one at time and in accordance with the review order to one or more reviewer computing devices until a stopping point is reached to thereby avoid sending any of the plurality of documents associated with lower tier scores to the one or more reviewer computing devices;
generating a graphical user interface with information associated with the tiers; and
transmitting the graphical user interface to a client computing device for display thereby.

69. The system of claim 68, wherein the method further comprises:
performing a statistical validation method configured to determine whether a reasonably high percentage of relevant documents are included in those of the plurality of documents sent to the one or more reviewer computing devices.

70. A system comprising at least one processor and memory storing processor executable instructions that when executed by the at least one processor perform a method comprising:
performing a plurality of document identifying operations on a document corpus comprising a plurality of documents, each of the plurality of document identifying operations identifying corresponding results comprising one or more of the plurality of documents, the plurality of documents being associated one each with a plurality of numeric tier scores;
after each of the plurality of document identifying operations, adding a relevance weight to any of the plurality of numeric tier scores associated with the one or more documents of the corresponding results;
organizing the plurality of documents into tiers based on the plurality of numeric tier scores, the tiers being ranked from a highest one of the plurality of numeric tier scores to a lowest one of the plurality of numeric tier scores to thereby define a review order;

sending the tiers one at time and in accordance with the review order to one or more reviewer computing devices until a stopping point is reached to thereby avoid sending any of the plurality of documents associated with lower tier scores to the one or more reviewer computing devices; and
performing a statistical validation method configured to determine whether a reasonably high percentage of relevant documents are included in those of the plurality of documents sent to the one or more reviewer computing devices.

71. A computer-implemented method for use with a document corpus comprising a plurality of documents, the computer-implemented method comprising:
associating, by at least one computing system, each of the plurality of documents with a tier score to thereby define a plurality of numeric tier scores;
receiving, by the at least one computing system, user-defined criteria related to at least one document identifying operation;
performing, by the at least one computing system, the at least one document identifying operation on the document corpus, the at least one document identifying operation identifying results comprising one or more of the plurality of documents;
displaying, by the at least one computing system, a graphical user interface allowing a user to demote or promote the results;
receiving, by the at least one computing system, an indication from the graphical user interface indicating that the user is demoting or promoting the results;
when the indication indicates that the user is promoting the results, increasing, by the at least one computing system, each of any of the plurality of numeric tier scores associated with the one or more documents of the results by a relevance weight;
when the indication indicates that the user is demoting the results, decreasing, by the at least one computing system, any of the plurality of numeric tier scores associated with the one or more documents of the results;
organizing the plurality of documents into tiers based on the plurality of numeric tier scores having a review order; and
sending the tiers one at time and in accordance with the review order to one or more reviewer computing devices until a stopping point is reached.

72. The computer-implemented method of claim 71, wherein, before the plurality of documents is organized into the tiers, the at least one computing system revises, at least once, a portion of the plurality of numeric tier scores by:
receiving new user-defined criteria related to at least one new document identifying operation,
performing the at least one new document identifying operation on the document corpus, the at least one new document identifying operation identifying new results comprising a portion of the plurality of documents,
displaying the graphical user interface, which allows the user to demote or promote the new results,
receiving a new indication from the graphical user interface indicating that the user is demoting or promoting the new results,
increasing any of the plurality of numeric tier scores associated with the portion of the documents of the new results when the new indication indicates that the user is promoting the new results, and decreasing any of the plurality of numeric tier scores associated with the portion of the documents of the new results when the new indication indicates that the user is demoting the new results.

73. The computer-implemented method of claim 71, further comprising:
displaying, by the at least one computing system, information associated with the tiers in the graphical user interface.

74. The computer-implemented method of claim 71, further comprising:
receiving, by the at least one computing system, the relevance weight as user input.

75. The computer-implemented method of claim 71, wherein each of any of the plurality of numeric tier scores associated with the one or more documents of the results is set equal to a default numerical value when the indication indicates that the user is demoting the results.

76. The computer-implemented method of claim 75, further comprising:
setting, by the at least one computing system, each of the plurality of numeric tier scores equal to the default numerical value before the at least one document identifying operation is performed.

77. A computer-implemented method for use with a document corpus comprising a plurality of documents, the computer-implemented method comprising:
associating, by at least one computing system, each of the plurality of documents with a tier score to thereby define a plurality of numeric tier scores;
receiving, by the at least one computing system, user-defined criteria related to at least one document identifying operation;
performing, by the at least one computing system, the at least one document identifying operation on the document corpus, the at least one document identifying operation identifying results comprising one or more of the plurality of documents;
displaying, by the at least one computing system, a graphical user interface allowing a user to demote or promote the results;
receiving, by the at least one computing system, an indication from the graphical user interface indicating that the user is demoting or promoting the results;
when the indication indicates that the user is promoting the results, increasing, by the at least one computing system, any of the plurality of numeric tier scores associated with the one or more documents of the results;
when the indication indicates that the user is demoting the results, setting, by the at least one computing system, each of any of the plurality of numeric tier scores associated with the one or more documents of the results equal to a default numerical value;
organizing the plurality of documents into tiers based on the plurality of numeric tier scores having a review order; and
sending the tiers one at time and in accordance with the review order to one or more reviewer computing devices until a stopping point is reached.

78. The computer-implemented method of claim 77, wherein, before the plurality of documents is organized into the tiers, the at least one computing system revises, at least once, a portion of the plurality of numeric tier scores by:
receiving new user-defined criteria related to at least one new document identifying operation,
performing the at least one new document identifying operation on the document corpus, the at least one new document identifying operation identifying new results comprising a portion of the plurality of documents,
displaying the graphical user interface, which allows the user to demote or promote the new results,
receiving a new indication from the graphical user interface indicating that the user is demoting or promoting the new results,
increasing any of the plurality of numeric tier scores associated with the portion of the documents of the new results when the new indication indicates that the user is promoting the new results, and
decreasing any of the plurality of numeric tier scores associated with the portion of the documents of the new results when the new indication indicates that the user is demoting the new results.

79. The computer-implemented method of claim 77, further comprising:
displaying, by the at least one computing system, information associated with the tiers in the graphical user interface.

80. The computer-implemented method of claim 77, wherein each of any of the plurality of numeric tier scores associated with the one or more documents of the results is increased by a relevance weight when the indication indicates that the user is promoting the results, and
the computer-implemented method further comprises receiving, by the at least one computing system, the relevance weight as user input.

81. The computer-implemented method of claim 77, further comprising:
setting, by the at least one computing system, each of the plurality of numeric tier scores equal to the default numerical value before the at least one document identifying operation is performed.

* * * * *